US012764430B2

(12) United States Patent
Tecchiolli et al.

(10) Patent No.: US 12,764,430 B2
(45) Date of Patent: Oct. 13, 2026

(54) FEEDBACK-CONTROLLED SENSOR ARRAY AND SENSOR UNIT

(71) Applicant: AI4IV SRL, Amaro (IT)

(72) Inventors: Giampietro Tecchiolli, Trento (IT); Massimo Gottardi, Trento (IT); Michela Lecca, Trento (IT); Luca Parmesan, Ala (IT)

(73) Assignee: AI4IV SRL, Amaro (IT)

( * ) Notice: Subject to any disclaimer, the term of this patent is extended or adjusted under 35 U.S.C. 154(b) by 0 days.

(21) Appl. No.: 19/640,307

(22) Filed: Apr. 6, 2026

(65) Prior Publication Data

US 2026/0222696 A1 Jul. 30, 2026

Related U.S. Application Data

(63) Continuation of application No. 18/858,166, filed as application No. PCT/EP2022/074535 on Sep. 2, 2022.

(30) Foreign Application Priority Data

Apr. 19, 2022 (IT) ........................ 102022000007766

(51) Int. Cl.
*H04N 25/40* (2023.01)
*H04N 25/10* (2023.01)
*H04N 25/20* (2023.01)

(52) U.S. Cl.
CPC ............. *H04N 25/40* (2023.01); *H04N 25/10* (2023.01); *H04N 25/20* (2023.01)

(58) Field of Classification Search
CPC ...................................................... H04N 25/40
See application file for complete search history.

(56) References Cited

U.S. PATENT DOCUMENTS 6,606,121 B1 * 8/2003 Bohm .................. H04N 25/772 348/E3.018
6,778,212 B1 8/2004 Deng et al.
(Continued)

FOREIGN PATENT DOCUMENTS

JP H11-505100 A 5/1999
JP 2001-054022 A 2/2001
(Continued)

OTHER PUBLICATIONS

International Search Report and Written Opinion received for PCT Patent Application No. PCT/EP2022/074535, mailed on Jan. 23, 2023, 15 pages.

(Continued)

*Primary Examiner* — Jayanti K Patel
*Assistant Examiner* — Christopher Kingsbury Glover
(74) *Attorney, Agent, or Firm* — ArentFox Schiff LLP

(57) ABSTRACT

A system, apparatus, and method for feedback-controlling a sensor array are disclosed. The apparatus includes an imaging sensor unit having a sensor module with a plurality of photosensors, a memory module coupled to the sensor module and configured to receive a sensor output therefrom, and a local control module coupled to the sensor module. The local control module is configured to receive a local feedback signal from the sensor module and a global feedback signal, and to use the local feedback signal and the global feedback signal to control the memory module to store the sensor output.

15 Claims, 14 Drawing Sheets

(56) References Cited

U.S. PATENT DOCUMENTS

| | | | | |
|---|---|---|---|---|
| 2008/0001065 | A1* | 1/2008 | Ackland | H04N 25/78 348/E3.019 |
| 2016/0330391 | A1* | 11/2016 | Bulteel | H04N 25/623 |
| 2024/0340546 | A1 | 10/2024 | Mahara | |

FOREIGN PATENT DOCUMENTS

| | | | |
|---|---|---|---|
| JP | 2003-219279 | A | 7/2003 |
| JP | 2009-543454 | A | 12/2009 |
| JP | 2011-257296 | A | 12/2011 |
| JP | 2016-527787 | A | 9/2016 |
| JP | 2021-534603 | A | 12/2021 |
| WO | 2008/005301 | A2 | 1/2008 |
| WO | 2023/202788 | A1 | 10/2023 |

OTHER PUBLICATIONS

Notice of Submission of Opinion issued in Korean Application No. 10-24-7036539, mailed Aug. 7, 2026, with English Translation, 18 pages.

Office Action received for Japanese Patent Application No. 2024-561910, mailed on Aug. 27, 2026, 12 pages (6 pages of English Translation and 6 pages of Original Document).

* cited by examiner

FEEDBACK-CONTROLLED SENSOR ARRAY AND SENSOR UNIT

CROSS REFERENCE TO RELATED APPLICATION(S)

This application is a Continuation of U.S. Non-Provisional application Ser. No. 18/858,166, filed Oct. 18, 2024, which is a National Stage Entry of PCT/EP2022/074535, filed Sep. 2, 2022, which claims priority to European Patent Application 102022000007766, filed Apr. 19, 2022, the entire contents of which are hereby incorporated by reference herein.

TECHNICAL FIELD

The present application relates to a system, apparatus and method for feedback-controlling a sensor array, and in particular an image sensor array, an individual sensor unit of an image sensor array, and a method for providing local and global feed-back control of the image sensor array and sensor unit to optimize the sensing dynamics.

BACKGROUND OF INVENTION

A sensor array is a group of sensors, usually arranged in a regular geometric pattern, for detecting and processing a type of signal. Examples of sensor arrays include optical arrays, such as those used in image sensors and cameras; electromagnetic radiation sensor arrays, such as those used in deep-space telescopes and ground-based antennas; chemical sensor arrays; pressure sensor arrays; sonar arrays; and geophone arrays.

An image sensor or image sensor array or imager is a sensor that detects the spatial distribution of the electromagnetic radiation (visible or not visible) hitting the sensor to make an image that conveys relevant information. Complementary metal-oxide-semiconductor (CMOS) sensors are an example of active pixel image sensors used in modern cameras to capture images. These sensors typically include a regular geometric pattern of pixels which are globally controlled.

However, CMOS image sensors (CIS) have certain disadvantages in particular conditions. A CMOS sensor may capture a row of pixels at a time, and thus a resultant image may experience a rolling shutter effect, where an image is skewed. Even CMOS sensors using global-shutters may require post-processing to form a clear image information of a moving object. However due to the way in which pixel outputs are captured in a CMOS sensor, this can introduce image artefacts from the output of pixels at a previous moment in time. Furthermore, in the simultaneous presence of bright and dark areas of a scene, many details of an image can be lost due to the over/under-exposition of the pixels containing the bright and dark areas.

Vision, i.e. the technology that deals with images, is the sensing technology with the largest information density, which better describes our surrounding world. To interpret a scene in real-time machine vision applications, intensive digital processing is usually required which must be carried out by high-performance computing platforms, especially when Artificial Intelligence techniques are used. Machine vision applications typically use cameras embedding auto-exposure control, pixel correction, analogue-to-digital conversion and standard output video format. Although they have high performance, one of the main drawbacks of these applications is a fixed dynamic range, which can heavily limit their use in many outdoor scenarios with uncontrolled light conditions and/or high intra-scene dynamics, such as in automotive, surveillance and industrial processes monitoring applications.

The most common approach to acquire scenes that contain both bright and dark areas is based on the acquisition of two or multiple frames acquired at different exposure times that are merged into a single High Dynamic Range (HDR) image using post-processing, software-based techniques. However, this approach can generate artefacts, especially in scenarios with fast moving objects, due to the time lag between the acquisitions of frames causing misalignment between images taken at different moments. On the other hand, if more sensors working with different exposure times are used alongside to capture the images to be merged, the problems caused by moving objects can be mitigated but not fully solved, and further post-processing is required to fix potential misalignments in the images (the so called "disparity" problem), at a high cost in terms of space and energy.

Other approaches have been adopted to acquire single exposure HDR images with a low probability of generating artefacts: Sensor arrays based on pixels with a compressed dynamic response in current or voltage, (e.g., logarithmic-logarithmic or linear-logarithmic) that suffer a loss of information in the compressed portion of the dynamic range and/or a presence of a significant level of noise when the signal is weak; Sensor array based on pixels with double photodiodes: one with high sensitivity, and the other with low sensitivity, whose signals are fused together after the exposure time. However, this solution needs redundant pixels and a careful design to reduce crosstalk among pixels and to obtain uniform optical performance; and Sensor arrays based on pixels with lateral overflow that can be very effective in providing single exposure HDR images but with the cost of an increased complexity that can result in signal to noise ratio (S/N) issues.

Often, photographic quality and resolution of an image is not that important if a low photographic quality is compensated by the capacity of the sensor to catch all the relevant details of the scene, When a sensor is capable of catching all relevant details, the system is able to interpret the scene through early access to visual features, that can be efficiently extracted by the image, thus allowing the system to take fast and reliable decisions. For example, an image acquired by a sensor that uses a different level of sensitivity for different areas of the scene may look distorted, flat or with wrong colours, but, if this is due to a mechanism that enhances the visibility of the relevant details contained in the scene, the recognition capability of a vision system that uses such images can be improved.

In this respect, custom vision sensors designed for machine vision allow a close and effective integration of the mixed analogue-to-digital image processing layers with the photo sensing elements, thus providing fast and low-power visual processing devices. On the other hand, their main drawback can be the larger pixel size, compared to that of commercial imagers designed for photography, meaning a larger chip area and higher silicon cost required for a sensor with the same pixel resolution. Nevertheless, there is a large area of applications relying on vision technology that do not need high resolution but rather high dynamic-range and low power consumption such as people/objects monitoring, tracking and detection, surveillance scenarios, and human-machine interfaces.

The above considerations also apply in all cases where the physical quantities to be acquired are distributed in space, whereby their spatial distribution is important, and when their distribution is detected using sensors different from ones based on the visible light. This applies in, for example, the case of electromagnetic waves not in the visible spectrum (i.e., infrared, ultraviolet, terahertz, etc.) or other physical sources (i.e., sound, pressure, etc.).

In contrast to CMOS image sensors and the artificial sensor arrays mentioned above, biological vision, exemplified by the human eye, is not based on globally-controlled, evenly spaced array of identical photosensitive elements but uses an irregular distribution of different types of light receptors, primarily cone, rod and ganglion cells, to detect, in an autonomous way (i.e., without the need of a global control system) the incoming optical light. The rod and cone cells are connected in a biological feedback system including bipolar cells, ganglion cells and ultimately the brain via the optic nerve. The retinal ganglion cells, that show also some capability to detect light as shown by recent results (i.e., their behaviour is influenced by the hitting light), receive inputs from, on average, approximately a hundred rod and cone cells. The retinal ganglions collectively transmit image-forming and non-image forming visual information in the form of action potential. Excitation of retinal ganglion cells results in an increased firing rate of action potential while inhibition results in a depressed rate of firing action potential. This biological system is capable of adaptively using simple inputs, from rods and cone cells, to discern complex visual information in the visual cortex of the brain. Different cells are excited depending on the local and global characteristics of a scene presented to the human eye. Furthermore, the human vision system does not introduce artefacts into images and, as noted above, biological vision does not require a regular geometric arrangement of cells and does not rely wholly on a global control. Finally, images acquired by a biological vision system, look bad (typically blurred, distorted and even monochromatic in some cases) if compared with the typical image acquired by a standard CMOS imager. The quality of the image and its content of information is fully restored by the brain through a feedback-driven process that optimizes the retina's response.

It has been appreciated that a sensor array inspired by biological vision systems can overcome the problems associated with artificial sensor arrays.

SUMMARY OF INVENTION

This Summary is provided to introduce a selection of concepts in a simplified form that are further described below in the Detailed Description.

In a first aspect, the present disclosure provides an imaging sensor unit comprising: a sensor module, including a plurality of photosensors; a memory module coupled to the sensor module, the memory module configured to receive a sensor output from the sensor module; a local control module coupled to the sensor module, the local control module configured to: receive a local feedback signal from the sensor module; receive a global feedback signal; and use the local feedback signal and the global feedback signal to control the memory module to store the sensor output. The sensor module may be referred to as a photoreceptor or photoreceptor unit.

Having a local control module control the function and operation of a plurality of photosensors in this way, allows the sensor unit to operate at least partially independently of other sensor units, and allows the sensor output to be stored according to an optimal time or condition that is set based on the global feedback signal and the local feedback signal. The photosensors may be photodiodes, or any photosensitive element.

Preferably, the global feedback signal includes a threshold value; and wherein the local control module is configured to: compare the local feedback signal to the threshold value of the global feedback signal; and upon the local feedback signal meeting the threshold value, control the memory module to store the sensor output.

The global feedback signal may be adjustable and may be provided from an external source such as a global control module or computer. An optimal threshold value may be determined prior using various optimization techniques at the computer.

Preferably, the plurality of photosensors include: a first photosensor sensitive to a first portion of the visible spectrum, the first photosensor configured to output a first sensor output component; a second photosensor sensitive to a second portion of the visible spectrum, the second photosensor configured to output a second photosensor output component; and a third photosensor sensitive to a third portion of the visible spectrum, the third photosensor configured to output a third photosensor output component; such that the sensor output includes the first, second and third photosensor output components.

Preferably, the imaging sensor unit further comprises: a summation node configured to sum the first, second and third photosensor output components to generate a summation value, wherein the local feedback signal includes the summation value, such that: the local control module is configured to compare the summation value and the threshold value of the global feedback signal; wherein, upon the summation value meeting the threshold value, the local control module is configured to: cause the memory module to store the first, second and third photosensor output components.

Alternatively to the summation node, the imaging sensor unit preferably further comprises: a winner-takes-all node configured to: receive the first, second and third photosensor output components; determine a winning photosensor output component by identifying which of the first, second and third photosensor output components exhibits the greatest difference in magnitude to an initial value of the respective first, second and third output components; wherein the local feedback signal includes the winning photosensor output component, such that: the local control module is configured to compare the winning photosensor output component and the threshold value of the global feedback signal wherein, upon the winning photosensor output component meeting the threshold value, the local control module is configured to: cause the memory module to store the first, second and third photosensor output components.

Preferably, the first photosensor is sensitive to red light, the second photosensor is sensitive to green light, and the third photosensor is sensitive to blue light.

Preferably, the plurality of photosensors include a wide-spectrum photosensor, the wide-spectrum photosensor being configured to detect a brightness of an observed scene and produce a brightness output, wherein the local feedback signal includes the brightness output, such that, upon the brightness output meeting the threshold value of the global feedback signal, the local control module is configured to: cause the memory module to store the sensor output.

This wide-spectrum photosensor may be used in combination with the first, second and third photosensors, with the summation node, or with the winner takes all node set out above. When used with the first, second and third photosensors, using the wide-spectrum photosensor output as the local feedback signal means that outputs from the first, second and third photosensors do not need to be sampled or interfered with prior to storing.

Preferably, the plurality of photosensors include a wide-spectrum photosensor, the wide-spectrum photosensor being configured to detect a brightness of an observed scene and produce a brightness output; wherein the local control module is further configured to receive a second local feedback signal and a second global feedback signal, wherein the second local feedback signal includes the brightness output, and wherein the second global feedback signal includes a second threshold value; wherein the local control module is configured to compare the second local feedback signal to the second threshold value, such that, upon the second local feedback signal meeting the second threshold value, the local control module is configured to: cause the memory module to store the brightness output; wherein the imaging sensor further comprises a readout module, configured to output, from the imaging sensor, one or more of the brightness output, the first, second and third photosensor element outputs, based on a result of a comparison with, or function of, a third global feedback signal received at the readout module.

Using both the Wide-spectrum photosensor and either of the summation node or the winner takes all node allows two contributions to the local feedback signal, each of which may be used to trigger the storing of the sensor output. The wide-spectrum photosensor may be a high-sensitivity photosensor configured to detect a brightness of an observed scene and produce a brightness output even in presence of a low or very low intensity of the incident light, wherein the wide-spectrum photosensor is more sensitive to incident light than the first, second and third photosensors.

Preferably, the wide-spectrum photosensor is configured to detect white light.

Preferably, the wide-spectrum photosensor is configured to detect infrared light.

Preferably, the imaging sensor unit is subject to a maximum exposure time, wherein, if the local feedback signal does not meet the threshold value, within the maximum exposure time, the memory module is configured to store the sensor output.

The imaging sensor unit may form part of an array of multiple imaging sensors units. Each of these units may be globally controlled in a synchronous manner, such that each unit is activated to begin sensing at the same time, and such that each unit has the same maximum exposure period. However, based on the local control module of each imaging sensor unit, the sensor output stored by each unit may be different, and stored at different times. Each of these sensor outputs and the relative times they were stored may be read out in a synchronous manner at the end of the maximum exposure period.

Preferably, the local control module is further configured to: cause the memory module to store timing information indicative of a time at which the sensor output is stored.

Preferably, the memory module is configured to receive a timing signal as part of the global feedback signal, and wherein the timing information is a recording of the timing signal at the time at which the sensor output is stored.

Storing timing information in this manner means that the imaging sensor unit stores both a sensor output, according to some optimal condition dependent on the local feedback signal and the global feedback signal, and a time at which the sensor output is stored, indicative of when the optimal condition was achieved. Having both of these parameters may be beneficial in post-processing tasks to obtain absolute sensor values.

According to a second aspect, there is provided a sensor array comprising a plurality of imaging sensors according to the first aspect, the sensor array further comprising: a global control module configured to globally control the sensor array, wherein the global control module is configured to provide the global feedback signal to each of the plurality of imaging sensors.

Preferably, the global feedback signal is adjustable to adjust the characteristics of an image captured by the sensor array. The global feedback signal may include a plurality of different signals such as the timing signal, and the first, second, third global feedback signals.

Preferably, the sensor array further comprises a readout circuit configured to readout the stored sensor output from the plurality of imaging sensors.

Preferably, the readout circuit is further configured to readout timing information for each of the plurality of imaging sensors, wherein the timing information is indicative of a time at which the stored sensor output is stored for each of the plurality of imaging sensors.

As noted above, the sensor array may be controlled in a globally synchronous manner such that each sensor unit is activated at the same time, and the process of read-out of the sensor units occurs at the same time after a global maximum exposure time. However, each sensor unit is controlled locally too, meaning that each unit stores sensor output values and timing information which may be acquired before the end of the maximum exposure time, according to some optimal condition being achieved based on the use of the global feedback signal and the local feedback signal of each particular sensor unit.

Preferably, the sensor array is communicatively coupled to a computer device, wherein the readout circuit is configured to send information relating to at least the sensor output of each of the plurality of imaging sensors to the computer device.

Preferably, the sensor array further comprises one or more motion sensor units, the one or more motion sensor units comprising: a photosensor; a motion sensor memory module, configured to receive a timing signal; and a motion sensor control module; wherein the motion sensor control module is configured to: receive and compare a sensor output of the photosensor and a global motion threshold value; and upon the sensor output of the photosensor meeting the global motion threshold value; cause the memory module to store timing information from the timing signal, the timing information indicative of a time at which the global motion threshold value is met; wherein the motion sensor memory module comprises a switch configured to modify a storage location of the timing information wherein: during a first active motion sensor phase of the photosensor, corresponding to a first frame of the observed scene, the switch is positioned in first position corresponding to a first storage location; and during a subsequent second active motion sensor phase of the photosensor, corresponding to a second frame of the observed scene, the switch is positioned in a second position corresponding to a second storage location, such that the local control module is configured to: cause the memory module to store first timing information indicative of a time at which the global motion threshold is met for the first active motion sensor phase in the first storage location; and cause the memory module to store second timing information indicative of a time at which the global motion threshold is met for the second active motion sensor phase in the second storage location; and wherein the local control module is configured to: compute a difference value corresponding to a difference between the first timing information and the second timing information; compare the difference value with a second global motion threshold value; and upon the difference value meeting the second global motion threshold value, output, from the motion sensor, a signal indicative that motion has been detected between the first and second frame of the observed scene.

Preferably, the first global motion threshold value and the second global motion threshold value are adjustable.

Preferably, the first global motion threshold value is a photosensor output threshold value and the second global motion threshold is a time threshold value.

Preferably, the signal indicative that motion has been detected between the first and second frame of the observed scene is configured to activate the plurality of imaging sensor units.

Preferably, the sensor array comprises a plurality of motion sensor units.

Preferably, the plurality of motion sensor units are arranged at least around a periphery of the sensor array.

Using motion detectors such as this, that effectively detect brightness changes between frames at a local level, enables the sensor array to become 'movement-activated', whereby activation of one or more of the sensor units is dependent on excitation of the motion sensor units. Based on which motion sensor units are excited, the sensor units of the sensor array may only be activated in a region of the sensor array in which the excited motion sensors are localized.

According to a third aspect, there is provided a method of controlling an imaging sensor unit, wherein the imaging sensor unit comprises: a sensor module including a plurality of photosensors; a local control module coupled to the sensor module; and a memory module coupled to the sensor module; wherein the method comprises: receiving, at the memory module, a sensor output from the sensor module; receiving, at the local control module, a local feedback signal from the sensor module; receiving, at the local control module, a global feedback signal; and using the local feedback signal and the global feedback signal to control the memory module to store the sensor output.

Preferably, the method includes operating the imaging sensor unit according to a cycle, the cycle being defined by: an active sensor phase, initiated by: activating the sensor module from an initial state such that the sensor module begins to detect and produces the sensor output; and an inactive sensor phase, initiated by: resetting the sensor module to the initial state.

Preferably, the method further comprises entering the active sensor phase; and after storing the sensor output, entering the inactive sensor phase.

Preferably, the duration of the active sensor phase is limited by a maximum exposure time, such that the method further comprises: at the maximum exposure time, causing the memory module to store the sensor output; and entering the inactive sensor phase such that the inactive sensor phase is entered after the maximum exposure time has elapsed.

Preferably, the method further comprises, upon storing the sensor output, storing timing information indicative of a time at which the sensor output is stored.

Preferably, the method further comprises controlling a plurality of imaging sensor units, the method comprising: synchronously entering the active phase for each of the imaging sensor units.

According to a fourth aspect, there is provided: a motion sensor, the motion sensor comprising: a photosensor; a motion sensor memory module, configured to receive a timing signal; and a motion sensor control module; wherein the motion sensor control module is configured to: receive and compare a sensor output of the photosensor and a global motion threshold value; and upon the sensor output of the photosensor meeting the global motion threshold value, cause the memory module to store timing information from the timing signal, the timing information indicative of a time at which the global motion threshold value is met; wherein the motion sensor memory module comprises a switch configured to modify a storage location of the timing information wherein: during a first active motion sensor phase of the photosensor, corresponding to a first frame of the observed scene, the switch is positioned in first position corresponding to a first storage location; and during a subsequent second active motion sensor phase of the photosensor, corresponding to a second frame of the observed scene, the switch is positioned in a second position corresponding to a second storage location, such that the local control module is configured to: cause the memory module to store first timing information indicative of a time at which the global motion threshold is met for the first active motion sensor phase in the first storage location; and cause the memory module to store second timing information indicative of a time at which the global motion threshold is met for the second active motion sensor phase in the second storage location; and wherein the local control module is configured to: compute a difference value corresponding to a difference between the first timing information and the second timing information; compare the difference value with a second global motion threshold value; and upon the difference value meeting the second global motion threshold value, output, from the motion sensor, a signal indicative that motion has been detected between the first and second frame of the observed scene.

According to a fifth aspect, there is provided a sensor unit comprising: a sensor element for detecting a physical property; a local control module coupled to the sensor element, the local control module configured to locally control the sensor element; a memory module coupled to the sensor element, the memory module configured to receive a sensor output from the sensor element, wherein the sensor output is time-variable; wherein the local control module is configured to receive and compare a local feedback signal and a global feedback signal, wherein the local feedback signal is based on the sensor output, and wherein the global feedback signal includes threshold criteria, wherein, upon the local feedback signal meeting the threshold criteria, the local control module is configured to: cause the memory module to store timing information indicative of a time at which the threshold criteria is met.

Preferably, the timing information is a measurement of a variable electrical signal that varies according to a predetermined relationship with time, the variable electrical signal being input to the memory module as part of the global feedback signal.

Preferably, the variable electrical signal is initialized at a start of an active sensor phase and is reset at an end of the active sensor phase, such that the measurement of the variable electrical signal is indicative of a time at which the threshold criteria is met since a time at which the active sensor phase is activated.

Preferably, if the sensor output does not meet the threshold criteria during a predetermined maximum exposure period, the local control module is configured to, at the end of the maximum exposure period: cause the memory module to store timing information indicative of a time at which the exposure period ends.

Preferably, the sensor element includes one or more photosensor elements configured to transduce/detect electromagnetic radiation.

Preferably, the one or more photosensor elements are configured to detect visible light.

Preferably, the one or more photosensor elements further include: a first photosensor element sensitive to a first portion of the visible spectrum, the first photosensor element configured to output a first photosensor element output; a second photosensor element sensitive to a second portion of the visible spectrum, the second photosensor element configured to output a second photosensor element output; and a third photosensor element sensitive to a third portion of the visible spectrum, the third photosensor element configured to output a third photosensor element output; such that the sensor output includes the first, second and third photosensor element output.

Preferably, the sensor unit further comprises: a summation node configured to sum the first, second and third photosensor element outputs to generate a summation value, wherein the local feedback signal includes the summation value such that: the local control module is configured to compare the summation value and the threshold criteria of the global feedback signal; wherein, upon the summation value meeting the threshold criteria, the local control module is configured to: cause the memory module to store the first, second and third photosensor element outputs.

Preferably, and alternatively to the summation node, the imaging sensor unit further comprises: a winner-takes-all node configured to: receive the first, second and third photosensor element outputs; determine a winning photosensor element output by identifying which of the first, second and third photosensor element outputs exhibits the greatest difference in magnitude to an initial value of the respective first, second and third photosensor element outputs; wherein the winning photosensor element output is the local feedback signal, such that: the local control module is configured to compare the winning photosensor element output and the threshold criteria of the global feedback signal; wherein, upon the winning photosensor element output meeting the threshold criteria, the local control module is configured to: cause the memory module to store the first, second and third photosensor element outputs.

Preferably, one or more photosensor elements include a wide-spectrum photosensor element, the wide-spectrum photosensor element configured to detect a brightness of an observed scene and produce a brightness output, wherein the sensor output is the brightness output. The wide-spectrum photosensor element may be used with the first, second and third photosensor elements, with the summation node, with the winner takes all node, or with none of these features. The wide-spectrum photosensor element may also be the only photosensor element in the sensor unit.

Preferably, the local feedback signal includes the brightness output of the wide-spectrum photosensor element, such that, upon the brightness output meeting the threshold criteria, the local control module is configured to: cause the memory module to store timing information indicative of a time at which the threshold criteria is met.

Preferably, when using the brightness output as indicated in the paragraph above, the one or more photosensor elements further include: a first photosensor element sensitive to a first portion of the visible spectrum, the first photosensor element configured to output a first photosensor element output; a second photosensor element sensitive to a second portion of the visible spectrum, the second photosensor element configured to output a second photosensor element output; and a third photosensor element sensitive to a third portion of the visible spectrum, the third photosensor element configured to output a third photosensor element output; wherein, upon the brightness output meeting the threshold criteria, the local control module is configured to: cause the memory module to store the first, second and third photosensor element outputs.

Preferably, the memory module further comprises a switch configured to modify a storage location of the timing information indicative of a time at which the threshold criteria is met, wherein: during a first active sensor phase of the wide-spectrum photosensor, corresponding to a first frame of the observed scene, the switch is positioned in first position corresponding to a first storage location; and during a subsequent second active sensor phase of the wide-spectrum photosensor, corresponding to a second frame of the observed scene, the switch is positioned in a second position corresponding to a second storage location, such that the local control module is configured to: cause the memory module to store first timing information indicative of a time at which the threshold criteria is met for the first active sensor phase in the first storage location; and cause the memory module to store second timing information indicative of a time at which the threshold criteria is met for the second active sensor phase in the second storage location; and wherein the local control module is configured to: compute a difference value corresponding to a difference between the first timing information and the second timing information; compare the difference value with a second global feedback signal, wherein the second global feedback signal includes second threshold criteria, and upon the difference value meeting the second threshold criteria, output, from the imaging sensor, an indication that the difference value has met the second threshold criteria.

Preferably, when using the summation node or the winner takes all node, the one or more photosensor elements further include a high-sensitivity, wide-spectrum photosensor element, the wide-spectrum photosensor element configured to detect a brightness of an observed scene and produce a brightness output even in presence of a low or very low intensity of the incident light; wherein the local control module is further configured to receive and compare a second local feedback signal and a second global feedback signal, wherein the second local feedback signal is the brightness output, and wherein the second global feedback signal includes second threshold criteria, wherein, upon the second local feedback signal meeting the second threshold criteria, the local control module is configured to: cause the memory module to store second timing information indicative of a time at which the second threshold criteria is met; and cause the memory module to store the brightness output; wherein the imaging sensor further comprises a readout module, configured to output, from the imaging sensor, one or more of the brightness output, the first, second and third photosensor element outputs, the timing information and the second timing information, based on a result of a comparison with, or function of, a third global feedback signal received at the readout module.

Preferably, the readout module is configured to compare the second timing information with the third global feedback signal, wherein the third global feedback signal includes third threshold criteria, and wherein the readout module is configured to output, from the imaging sensor, either the first, second and third photosensor element outputs and the first timing information, or the brightness output and the second timing information.

Preferably, the imaging sensor unit is configured to output the stored sensor output and the stored timing information from the imaging sensor unit.

Preferably, the first, second and third photosensor elements include red-light, green-light and blue-light sensitive photosensor elements.

According to a sixth aspect, there is provided a sensor array comprising a plurality of imaging sensors according to the fifth aspect, the sensor array further comprising: a global control module configured to globally control the sensor array, wherein the global control module is configured to provide the global feedback signal to each of the plurality of imaging sensors.

Preferably, the sensor array further comprises one or more first-type imaging sensors, wherein the global control module is configured to receive one or more of the indications from the first-type imaging sensors to determine whether motion is present in the observed scene between the first frame and the second frame.

Preferably, the sensor array further comprises one or more second-type imaging sensors, wherein the global control module is configured to activate/turn on the second-type imaging sensors upon determining that motion is present between the first frame and the second frame.

According to a seventh aspect, there is provided a method of controlling an imaging sensor unit, wherein the sensor unit comprises: a sensor element for detecting a physical property; a local control module coupled to the sensor element; and a memory module coupled to the sensor element, the memory module configured to receive a sensor output from the sensor element, wherein the sensor output is time-variable; wherein the method comprises: receiving, at the local control module, a local feedback signal and a global feedback signal, wherein the local feedback signal is based on the sensor output, and wherein the global feedback signal includes threshold criteria, comparing the local feedback signal and the threshold criteria; upon the local feedback signal meeting the threshold criteria, causing the memory module to store timing information indicative of a time at which the threshold criteria is met.

Preferably, the method includes operating the sensor unit according to a cycle, the cycle being defined by: an active sensor phase, initiated by: activating the sensor element from an initial state such that the sensor element begins to detect the physical property and produces the sensor output; and an inactive sensor phase, initiated by: resetting the sensor element to the initial state.

Preferably, the method includes: entering the active sensor phase; and after causing the memory module to store timing information indicative of a time at which the threshold criteria is met, entering the inactive sensor phase.

Preferably, the duration of the active sensor phase is limited by a maximum exposure time, such that the method further comprises: at the maximum exposure time, causing the memory module to store timing information indicative of the maximum exposure time; and entering the inactive sensor phase such that the inactive sensor phase is entered after the maximum exposure time has elapsed.

Preferably, the method further comprises, upon the local feedback signal meeting the threshold criteria, storing the sensor output.

Preferably, the method further comprises controlling a plurality of imaging sensor units, the method comprising: synchronously entering the active phase for each of the imaging sensor units.

Parts of the method described herein may be performed by software in machine readable form on a tangible storage medium, e.g., in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously. The method may be performed with the use of devices that exploit the concept of "programmable logic" like a programmable logic array, PLA, a complex programmable logic device, CPLD, a field-programmable gate array FPGA, and a simple programmable logic device SPLD, for example.

DESCRIPTION

Brief Description of Drawings

Embodiments of the invention will be described, by way of example, with reference to the following drawings, in which.

Figure 1:
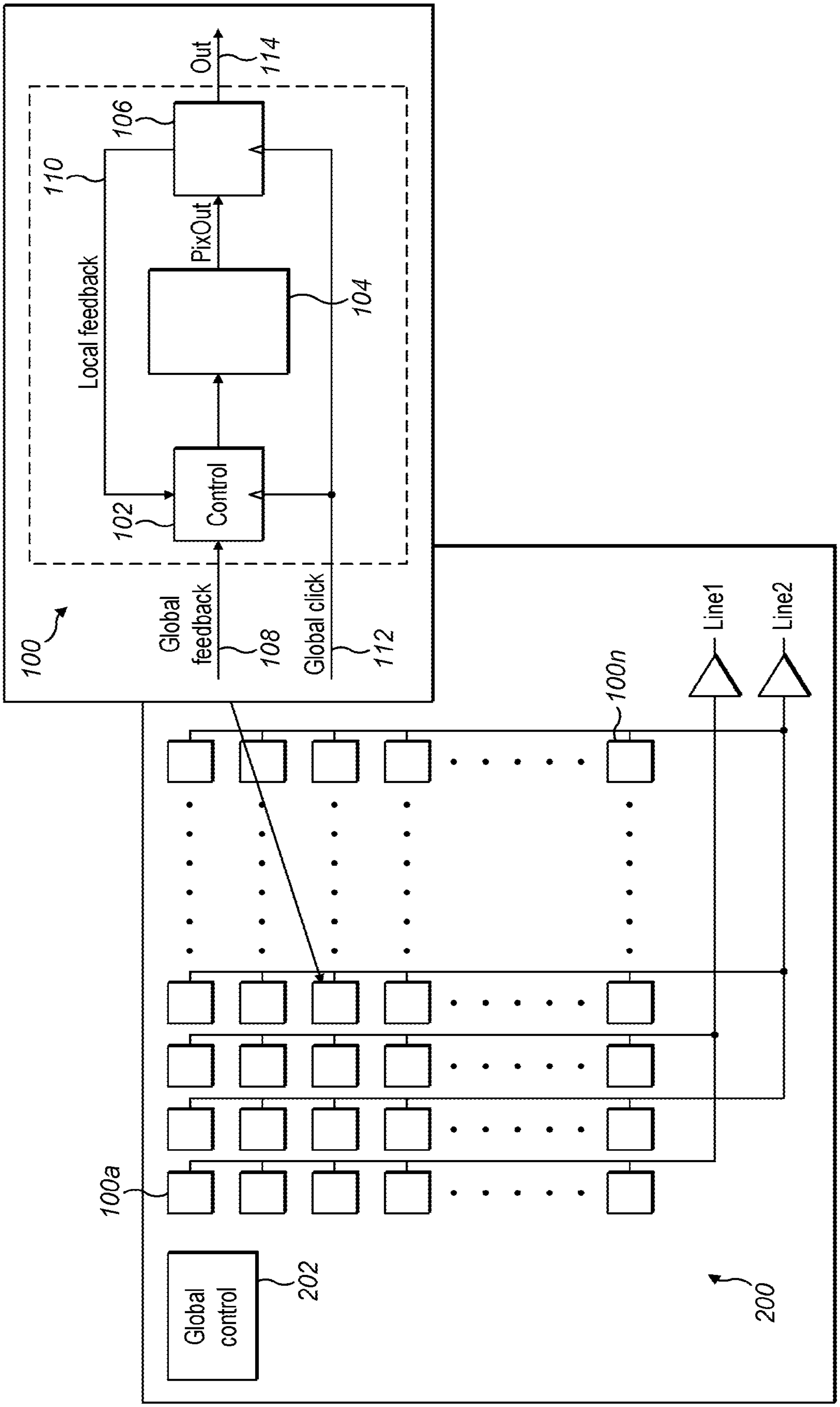
FIG. 1 is a schematic diagram of a sensor array including a plurality of sensor units according to an embodiment of the invention.

Common reference numerals are used throughout the figures to indicate similar features.

DETAILED DESCRIPTION

In the following description, the terms "sensor", "pixel", "photodiode", "photosensitive element" and "group of photodiodes" are used interchangeably in applications in which light is detected. It is to be understood that reference to one of these terms may be substituted for any other of the these terms.

FIG. 1 shows a schematic diagram of a plurality of sensor units 100*a* to 100*n* which define a sensor array 200. Each sensor unit 100 of the sensor array 200 includes a local control module 102, a plurality of sensor elements 104, and a memory module 106. The local control module 102 is provided with three inputs: a global feedback signal 108, a local feedback signal 110, and a global clock signal 112. The local control module 102 is configured to control the function of the sensor elements 104. The sensor elements 104 are configured to detect or otherwise sense a particular physical signal, and provide an output to the memory module 106. The memory module 106 is configured to provide a sensor unit output 114, which may then be stored in a computer or memory of the sensor array 200.

The sensor array 200 is built on a substrate that typically consists of some bulk material that is suitable to support all the electronic elements of a sensor including also all the necessary signal and power lines. The specific characteristics of the substrate depend on the fabrication technology.

In operation, a global control module 202 of the sensor array 200 is configured to provide global control of the sensor units 100*a* to 100*n*. This global-level control is complemented by local-level control at each of the sensor units 100*a* to 100*n* provided by the local control module 102. The global control module 202 is configured to provide the global feedback signal 108 to each sensor unit 100, and the local control module 102 is configured to utilise the local feedback 110 to locally control each respective sensor unit 100.

The global control module 202 is configured to control/regulate operation of each sensor unit 100*a* to 100*n* in cycles. Each cycle is started by a first pulse signal generated by the global control module 202. The first pulse signal is carried on the same line as the global clock signal 112, and is sent to each local control module 102 of each sensor unit 100*a* to 100*n* to initiate a sensor capture phase. When this first pulse is received by the local control module 102, the local control module 102 sends a first control signal to the sensor elements 104. This first control signal causes the sensor elements 104 to leave a reset/stand-by/low-power state and enter a detecting/active state to initiate the sensor capture phase.

The cycle is completed when the end of the sensor capture phase is reached. This is notified to the sensor units 100*a* to 100*n* by the global control module 202, which writes a second pulse on the same line that carries the global clock signal 112, to each local control module 102. Data is then collected from the sensor elements 104 via the sensor unit output 114 in a sensor readout phase. The second pulse triggers the local control module 102 to send a reset/stop signal to the sensor elements 104, forcing them to enter a low-power/no-operation state until a new cycle is started.

In some embodiments, once an optimal sensor state is reached, determined by meeting some condition/criterion in each individual sensor unit 100, the memory module 106 of the sensor unit 100 is configured to send an end signal using the same line used to send the local feedback signal 110, back to the control module 102 of the sensor unit 100. This end signal triggers the local control module 102 that sends a reset/stop signal to the sensor elements 104, forcing them to enter a low-power/no-operation state until a new cycle is started. The meeting of the condition/criterion is explained in more detail below.

The plurality of sensor elements 104 may each be the same type of sensor element. For example, the plurality of sensor elements 104 may each be an optical sensor element, whereby each optical sensor element is sensitive to a different wavelength of visible light, designed to be used in the presence of strong or weak light signals, that can provide fast or slow light-to-voltage conversion schemes, optimized to reduce electromagnetic or thermal noise and the like. In another example, one or more of the plurality of sensor elements 104 may be optical sensor elements sensitive to wavelengths in the visible range of wavelengths, and/or one or more of the plurality of sensor elements 104 may be sensor elements sensitive to wavelengths in a different range of wavelengths in the electromagnetic spectrum, such as the infrared range of the electromagnetic spectrum. It is to be understood that sensor elements that are sensitive to the gamma, x-ray, ultra-violet, microwave and radio-wave ranges of the electromagnetic spectrum may also be employed when such sensors are technologically compatible and can be implemented on the same substrate.

Alternatively, the plurality of sensor elements 104 may each include groups of different sensor elements that are each configured to detect a different type of signal or a different type of information extracted from the incoming signal.

A combination of optical/electromagnetic radiation sensors, thermal sensors, pressure sensors, chemical sensors and the like may be used together in the plurality of sensor elements 104 when they can be implemented on the same substrate.

The sensor units 100*a* to 100*n* as shown in FIG. 1 may be the same sensor unit 100, including the same plurality of sensor elements 104. Alternatively, one or more of the sensor units 100*a* to 100*n* may include different sensor units with different combinations of sensor elements 104 as set out above. This allows different sensor units 100*a* to 100*n* in the sensor array 200 to perform different functions and tasks. Each of the sensor units 100*a* to 100*n* is controlled, at least in part, locally by the local control module 102 according to the specific function of each of the sensor units 100*a* to 100*n*.

Since the sensor units 100*a* to 100*n* are controlled, at least in part, locally by the control module 102 of each sensor unit 100, the sensor units 100*a* to 100*n* are configured to function in an asynchronous manner, dependent on the function of each of the sensor units 100*a* to 100*n*.

The function of the sensor units 100*a* to 100*n* will now be described. As noted above, the operation of the sensor unit 100 is based on the repetition of a sequence of actions arranged in cycles. Each cycle is started by a first pulse signal carried on the same line as the global clock signal 112, to initiate a sensor capture phase. When this first pulse is received by the local control module 102, the local control module 102 sends a first control signal to the sensor elements 104. This first control signal causes the sensor elements 104 to leave a reset/stand-by/low-power state and enter a detecting/active state.

In the detecting state, sensing begins, and the sensor elements 104 are configured to provide a sensing output to the memory module 106. The sensor elements 104 are configured to detect a physical signal by converting the physical signal into an electrical signal, for example. How each sensor element of the sensor elements 104 reacts to the physical signal will vary according to their specific characteristics. The electrical signals generated by each of the sensor elements 104 together form the sensing output, which is continuously monitored by the memory module 106. The electrical signals may be a voltage or current for example.

The memory module 106 is configured to provide the local feedback signal 110 to the local control module 102, whereby the local feedback signal 110 is based on the sensing output from the sensor elements 104. The local feedback signal 110 may be equivalent to the sensing output, meaning the memory module 106 simply passes the sensing output from the sensor elements 104 back to the local control module 102 as the local feedback signal 110. The memory module 106 uses the electrical signals from the sensor elements 104 to send the local feedback signal 110 to the control module 102. The local feedback signal 110 thus depends on the type, intensity or characteristics of the physical signal that is converted into the electrical signals.

The global feedback signal 108 is generated by the global control module 202 and is also provided to the local control module 102. The control module 102 combines the local feedback signal 110 generated by the memory module 106 with the global feedback signal 108 generated by the global control module 202 to produce a second control signal. The second control signal is used to tune working parameters and/or conditions of the sensor elements 104 (e.g., threshold voltages, control voltages, configuration signals, etc.) and to instruct the memory module 106 when the optimal sensor state is achieved or when the end of the sensor capture phase is reached, such that data from the sensor elements 104 can be captured and used to generate the sensor unit output 114. As noted above, the end of the sensor capture phase is indicated by the global control module 202 by a second pulse on the line carrying the global clock signal 112. The end of the sensor capture phase may correspond to a maximum sensor exposure time, which is a programmable time interval.

How and when the second control signal is produced depends on the implementation of the local control module 102. In particular, the local control module 102 uses the global feedback signal 108 and the local feedback signal 110 in a calculation, comparison or other computation to determine how or when to control the sensing elements 104 and/or the memory module 106 with the second control signal. The local control module 102 produces the second control signal when the global feedback signal 108 and the local feedback signal 110 meet a particular condition or criterion according to the comparison or calculation. Meeting the condition or criterion is indicative of that the optimal sensor state has been achieved.

Once the condition or criterion is met, the second control signal is configured to cause the sensor elements 104 and/or the memory module 106 to execute an action. For example, the second control signal causes the memory module 106 to produce the sensor unit output 114, for storing sensing data produced by the sensing elements 104. The sensor unit output 114 is then directed to a global memory or external computer, for example.

It is to be understood that, although the global clock signal 112 is stated above as being transmitted to the local control module 102 over a line, the global clock signal 112 may be implemented by more than one line. For example, the global clock signal 112 can comprise a first line (i.e. a wire), that carries the first and second pulses used to switch the sensor unit 100 between the low-power/no-operation state and the active/detecting state, and one or more further lines that define parameters or a type of activity to be initiated or performed by the sensor unit 100. Reference to the global clock signal 112 includes both of these possibilities.

At the same time at which the sensor data is stored or captured by the memory module 106 to produce the sensor unit output 114, the global clock signal 112, or a subset of it, is also stored or captured by the memory module 106. In particular, the global clock signal 112 includes a timing signal V(t) dependent on time or a function thereof. Capturing or recording a value of the timing signal V(t) at the same time at which data from the sensor elements 104 is captured provides an indication of the time at which the data is captured. This time data as well as the sensor data is used to produce the sensor unit output 114. Thus, the external computer or global memory to which the sensor unit output 114 is directed will have access to the data captured from the sensor elements 104 as well as the time of capture. Effectively, the timing signal of the global clock signal 112 is used by each sensor unit 100 to indicate a local time at which the criteria/condition for data capture was met at the local control module 102 of the sensor unit 100, and thus for when data from the sensor elements 104 was captured and stored. This mechanism enables the optimization of the sensing, in terms of signal-to-noise ratio or of any other quality metrics used in the application, on the basis of the local characteristics of the incident light and not on the basis of global parameters/characteristics (e.g., integration/exposure time) like in most of CMOS sensors.

The cycle is completed when the end of the sensor capture phase is reached. This is notified to the sensor unit 100 by the global control module 202, which writes the second pulse on the line that carries the global clock signal 112, to the local control module 102, as explained above.

In an example, the memory module 106 includes a sample and hold circuit. In this example, when the sensor elements 104 reach the optimal sensor state or when the end of the sensor capture phase is reached, the sample and hold circuit reads the electrical signals generated by each sensor element of the sensor elements 104, stores them, and makes them available via the sensor unit output 114.

Figure 2:
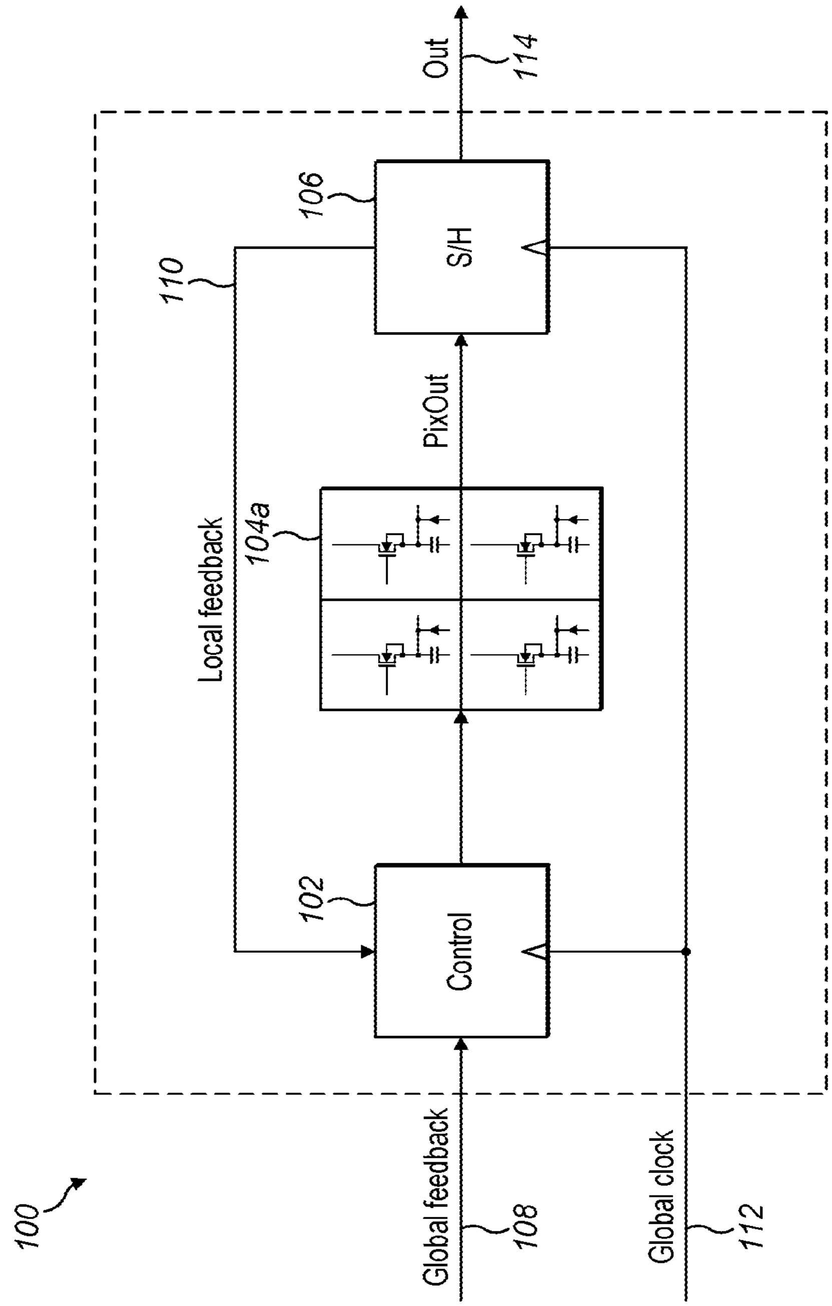
FIG. 2 is a schematic diagram illustrating a photoreceptor unit according to an embodiment of the invention.

FIG. 2 shows a particular implementation of the sensor unit 100 according to FIG. 1. In FIG. 2, the sensor unit 100 is a photoreceptor unit 100. The photoreceptor unit 100 is a type of vision or imaging sensor unit. The photoreceptor unit 100 includes a local control module 102, a plurality of sensor elements whereby the sensor elements are photosensitive elements 104*a*, and a memory module 106. The local control module 102 is provided with three inputs: a global feedback 108, a local feedback 110, and a global clock 112. The local control module 102 is configured to control the function of the photosensitive elements 104*a*. The photosensitive elements 104*a* are configured to detect light or a component thereof and provide a sensing output to the memory module 106. The memory module 106 is configured to provide a photoreceptor unit output 114 for storing at a global memory or utilising at a computer, for example. The components of the photoreceptor unit 100 of FIG. 2 are thus the same as in FIG. 1, and the sensor elements 104 are photosensitive elements 104*a*. It is however to be understood that different types of sensors can be used instead of the photosensitive elements 104*a*. The following description is thus relevant to all types of sensors as well as the photosensitive elements 104*a* (sensors) specified below.

The function of the photoreceptor unit 100 in FIG. 2 will now be described. The local control module 102 uses the global feedback signal 108, the global clock 112 and the local feedback 110 to control the operation of the photosensitive elements 104*a* and the memory module 106. The sensing output from the photosensitive elements 104*a* is a collection of voltages (PixOut) corresponding to a single voltage from each of the photosensitive elements 104*a*. These voltages are sent to the memory module 106. The memory module 106, which may be a sample and hold circuit, is configured to store the voltages when a condition/criterion is met, as described generally above. The memory module 106 makes available the stored voltages as the photoreceptor unit output 114. This output can be read and sent to an output interface of an apparatus, such as a computer or external memory, for final use.

The operation of the photoreceptor unit 100 is based on the same repetition of the cycles discussed above with reference to FIG. 1. Each cycle is started by a first pulse to initiate an image acquisition phase. When this pulse is received by the local control module 102, the local control module 102 sends a first control signal to the photosensitive elements 104*a*. This causes the photosensitive elements 104*a* to leave a reset/stand-by/low-power state and enter a detecting state. In the detecting state, the photosensitive elements 104*a* are configured to detect light by converting incident light rays into a time-varying voltage. For photosensitive sensors such as the photosensitive elements 104*a*, varying voltage is often represented by some discharge curve caused by incident photons. The voltages generated by the photosensitive elements 104*a* form the sensing output, and are continuously monitored by the memory module 106. The memory module 106 uses the voltages from the photosensitive elements 104*a* to send a local feedback signal 110 to the control module 102. In some implementations, the local feedback signal 110 is directly proportional or equivalent to the voltages produced by the photosensitive elements 104*a*. The control module 102 is provided with the local feedback signal 110 and the global feedback signal 108 generated by the global control module 202. The local feedback signal 110 and the global feedback signal 112 are then used in a comparison or calculation, depending on the specific implementation of the photoreceptor unit 100, to determine when a certain condition/criterion is met, indicative of an optimal sensor state being achieved. Once this condition/criterion is met, the local control module 102 generates a second control signal configured to control the photosensitive elements 104*a*, and/or control the memory module 106 to store data from the photosensitive elements 104*a* by outputting the sensor unit output 114. The memory module 106 may be a sample and hold circuit, in which case, the meeting of the condition/criterion causes the local control module 102 to control the sample and hold circuit to store the voltages corresponding to the sensing output of the photosensitive elements 104*a*, for generating the sensor unit output 114.

The sensor unit output 114 is then directed to a global memory or computer, for example. At the same time at which the voltage values are stored by the memory module 106, the global clock signal 112, or a subset of it, is also stored or captured by the memory module 106. In particular, the global clock signal 112 includes a timing signal V(t) dependent on time or that is a function thereof. Capturing or recording a value of the timing signal V(t) at the same time at which data from the photosensitive elements 104*a* is captured provides an indication of the time at which the data is captured. This time data as well as the voltage data is used to produce the sensor unit output 114. Thus, the computer or global memory to which the sensor unit output 114 is directed has access to the voltage data (sensor data) as well as an indication regarding the time at which it was sampled.

The photoreceptor unit 100 may be one of several photoreceptor units 100 that form part of the array 200 as shown in FIG. 1. Each of the photoreceptor unit outputs 114 from each of the plurality of these photoreceptor units 100 together form an acquired image/frame. This acquired image/frame is transferred out of the array 200 via, output ports Line1 and Line2. The global control module 202 of the array 200 is configured to control each of the photoreceptor units 100 in a sequence of cycles. These cycles include the image acquisition phase as explained above. At the end of the image acquisition phase for the whole array 200, an image readout operation is performed. The duration of the image acquisition phase is defined by a programmable time interval, which fixes the maximum exposure time for each photoreceptor unit 100 and thus each photosensitive element 104*a*. The time interval is stored in a register of the global control module 202. The time necessary for the readout phase depends on the size of the array, on the speed of data transfer lines and other working parameters. At the beginning of each cycle, the image acquisition phase is activated by the global control module 202 by generating a first pulse on the line of the global clock signal 112 as explained above. When the first pulse is detected, each photoreceptor unit 100 starts to convert the incident light in an independent and autonomous way, such that the global control module 202 and other photoreceptor units 100*a* to 100*n* do not have to be directly involved in the acquisition of data from a specific photoreceptor unit 100. To inform all photoreceptor units 100*a* to 100*n* that the image acquisition phase has ended (and the maximum exposure time has expired), the global control module 202 generates another, second pulse on the line used for the global clock signal 112. The global control module 202, at the beginning of the image acquisition phase, also generates the global feedback signal 108 to be used by each photoreceptor unit 100. The global feedback signal 108 may be different for different types of photoreceptor unit 100. In particular, more than one type of photoreceptor unit 100 may be present in the same array 200. On completion of the image acquisition phase, the global control module 202 starts the readout phase, in which the voltage values stored by each memory module 106 of each photoreceptor unit 100 are used to generate respective sensor unit outputs 114 which are sent to the output port (via Line1 and Line2). As noted above, the voltage values stored by each memory module 106 reflect data captured at the optimal state for each respective photoreceptor unit 100. By adding the suitable readout logic and circuits, the image acquisition phase and the readout phase can be, optionally, arranged according to a pipeline architecture and executed in parallel to speed up the number of images/frames generated per unit of time.

Moreover, if the global control module 202 is equipped with the suitable processing circuits, by reading/accessing the output values generated by each photoreceptor unit 100, it can tune the behaviour of the photoreceptor units 100*a* to 100*n* by generating the global feedback signal 108 at the beginning of each cycle. The global feedback signal 108 may be a static signal that does not change during the image acquisition phase or can be a variable signal that can be changed during the image acquisition phase. An example of static global feedback signal is represented by the global threshold voltages used by the photoreceptor units in FIGS. 3 and 5. These static signals are determined starting from the average illumination of a scene intended to be captured to minimize the noise and to improve the resolution. The global control module 202 can also work in combination with an external computer, microcontroller, programmable logic, microprocessor, etc. to generate optimal global feedback signals. In this case the external computer unit monitors/reads/accesses the stream of images/frames generated by the apparatus including the photosensitive array 200, processes them, and generates the optimal global feedback signal that is then stored in an internal memory unit of the global control module 202 and sent to the photoreceptors 100 during the image acquisition phase according to a programmable time scale.

The timing signal V(t) included as a component of the global clock signal 112 may also be considered to be a type of global feedback signal. The timing signal V(t) is discussed here in more detail. The timing signal V(t) is a signal that can be used to measure the time of the events that occur in the circuits (as explained above). The timing signal V(t) can also be considered as a global feedback signal because it is generated and tuned by the global control module 202 to set an appropriate time resolution for the measured data of the photoreceptor units 100 that is more suitable for the characteristics of the scene observed. This is explained in more detail later with reference to specific examples. However, in general, the timing signal V(t) included in the global clock signal 112 is an electrical signal that exhibits a known relationship with time within the image acquisition phase (the integration time period between the start and the end of the of each acquisition cycle), so that, by sampling the timing signal V(t), it is possible to perform a simple inversion operation to compute the time t at which data is recorded by the memory module 106 for a particular photoreceptor unit 100. In the following examples, the timing signal V(t) is implemented with a raising linear ramp that starts from a low value at the beginning of the image acquisition phase and reaches its maximum value at the end of the image acquisition phase. Such a shape of the timing signal V(t) has been used for exemplary purposes only, and, in general, it is possible to use any signal shape (linear or non linear, increasing or decreasing, etc.) that allows to compute the value of the time t when the timing signal V(t) is sampled. For this reason, the timing signal V(t) is a signal that can be used as a source to measure the time of an event. At the same time, the shape of the function of the timing signal V(t) can be modified to tune the resolution of the time measurements. Where the shape of the timing signal V(t) is selected such that, at a specific time t, a big change $\Delta t$ in t corresponds to a small change $\Delta V$ in the timing signal V(t), the time resolution at that specific time is low because a small increase in the measured electrical signal timing signal V(t) equates to a large elapsed time $\Delta t$. This means that any small noise on the timing signal V(t) is amplified when the timing signal V(t) is inverted to compute t. Vice versa, when the shape of the timing signal V(t) is selected such that a small change $\Delta t$ in time corresponds to a big change $\Delta V$ in the timing signal V(t), the time resolution is high because a big change $\Delta V$ equates to a small period $\Delta t$ and, in this case, the noise on the timing signal V(t) is attenuated when the timing signal V(t) is inverted to compute t. In exemplary implementations, the timing signal V(t) included in the global clock signal 112 is described by a linear shape/function, meaning the time resolution is constant over the integration period, whilst in other implementations the function describing the timing signal V(t) is non-linear, meaning the time resolution can change over the integration period and may be more or less accurate at certain times than at others.

Other global feedback signals can be generated to improve the overall performance of the apparatus including the photosensitive array 200 on the basis of global working conditions like the sensor's temperature and power consumption. For example, the voltage sources used to implement components such as the comparator in FIG. 3 or the Winner Takes All (WTA) circuits in FIG. 5 can be changed on the basis of such feedback signals to improve speed, precision or power consumption. These circuits and figures are explained in more detail below. The local feedback signal generated by memory module 106 in FIG. 1 is combined with the global feedback signal to tune the performance of each photoreceptor unit 100.

The photosensitive array 200 can improve the signal-to-noise ratio and provide energy saving benefits as will be discussed below.

Specific examples of the photosensitive array 200 and photoreceptor units 100 will now be described with reference to Figures from 3 to 10.

Figure 3:
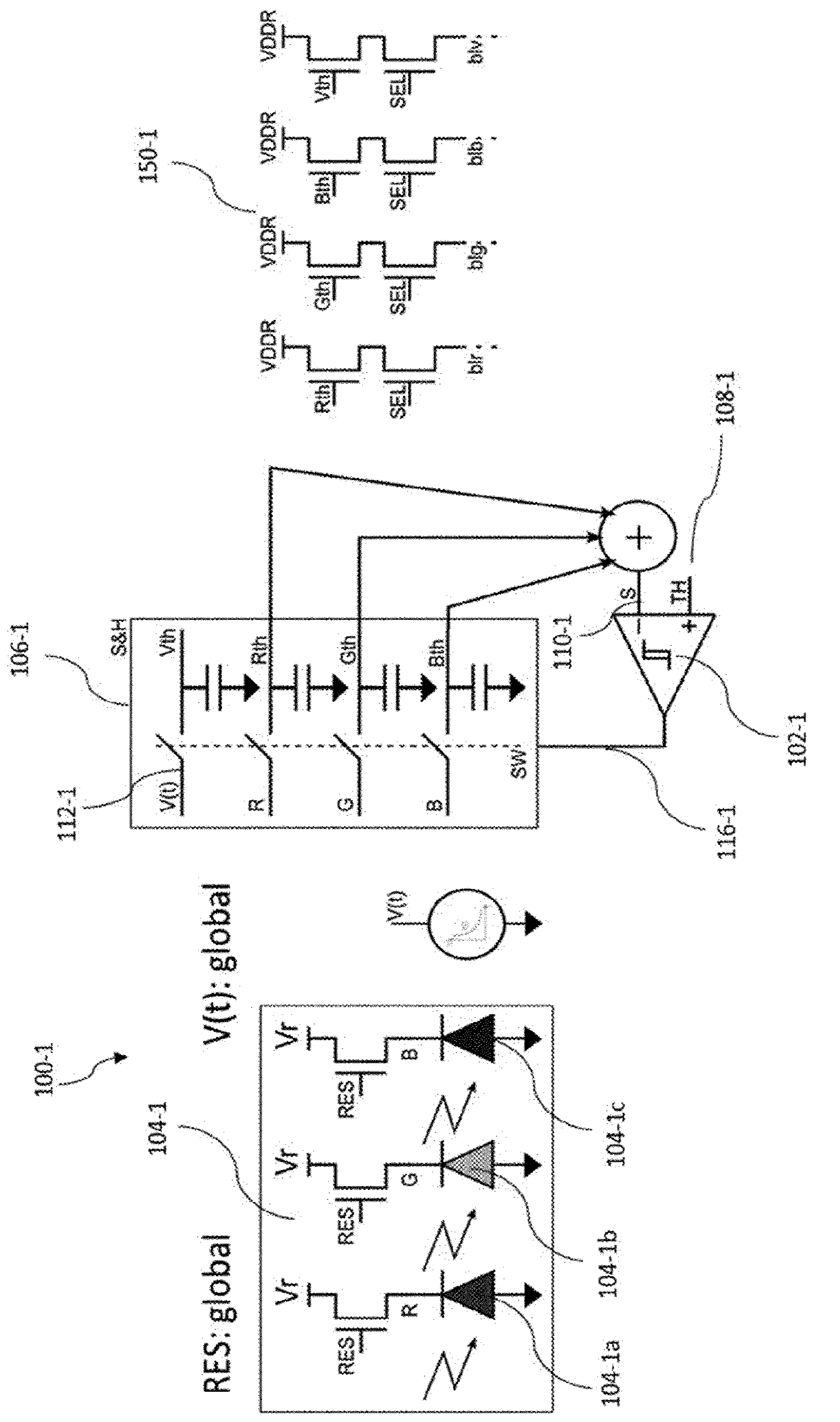
FIG. 3 is a schematic diagram illustrating a light intensity invariant function of a photoreceptor unit according to an embodiment of the invention.

FIG. 3 is a schematic diagram showing a first exemplary implementation of the photoreceptor unit 100-1. In this implementation, the local control module 102 includes a comparison circuit module 102-1, the photosensitive elements 104 are a group of photodiodes 104-1, including a red-light sensitive photodiode 104-1*a*, a green light photosensitive diode 104-1*b*, and a blue light photosensitive diode 104-1*c*. The memory module 106 is a sample and hold circuit 106-1, the global feedback signal 108 is a global threshold value 108-1, the local feedback signal 110 is a summation 110-1 of the sensor outputs from the photodiodes 104-1, and the global clock signal is a voltage signal V(t) 112-1 that is a function of time. The sensor unit output 114 is not shown but is also described below. The comparison circuit module 102-1 is a component of the local control module 102. It is to be understood that other circuits not shown in FIG. 3 may also be included in the local control module, for example, to use the global clock signal 112 to control the local operations of the photoreceptor 100-1. The local control module 102 can be configured to locally generate a reset signal from the global clock signal for the purpose of initiating a reset of the photodiodes 104-1. The local control module 102 can also generate a "store" signal for sending an instruction to capture and store data at the sample and hold circuit 106-1 when the integration phase has expired (as indicated by the global clock signal 112.

FIG. 3 also shows circuits 150-1 that may be used during the readout phase. In particular, when a particular photoreceptor unit 100 in a position (i,j) of the sensor array 200 must be read, the selection SEL signal corresponding to that photoreceptor unit 100 is asserted so that the Rth, Gth, Bth and Vth signals from corresponding line buffers, depicted as transistors in FIG. 3, connected to the supply voltage VDDR, are copied to the corresponding bit-lines blr, blg, blb and blv. These bit lines are grouped with those of other photoreceptor units of the same array 200, and are typically arranged in a column.

In operation of the first exemplary implementation of the photoreceptor unit 100, according to FIG. 3, during the image acquisition phase, the voltages of the red 104-1*a*, green 104-1*b*, and blue 104-1*c* photodiodes are sampled at the sample and hold circuit 106-1 and summed together at a summing node to form the summation 110-1 representing, at least in part, the local feedback signal. The summation 110-1 of the three voltages from the photodiodes 104-1 is fed into the comparison circuit module 102-1. The global threshold value 108-1 is also fed into the comparison circuit module 102-1. The comparison circuit module 102-1 compares the summation 110-1 with the global threshold value 108-1 using the comparator. Once the summation 110-1 reaches or crosses the global threshold value 108-1, the comparison circuit module 102-1 sends the second control signal discussed above along the line 116-1 as illustrated in FIG. 3. This second control signal controls the sample and hold circuit 106-1 to store the current values of voltages for the red 104-1a, green 104-1b, and blue 104-1c photodiodes, as well as the voltage value for the timing signal V(t) 112-1. This is done by, for example, opening the switches in the sample and hold circuit 106-1 illustrated in FIG. 3 to store voltage values for each of the corresponding signals. The action of the comparison circuit module 102-1 when the global threshold 108-1 is crossed is thus what is responsible for initiating capture of the sensor data. In an example, the local feedback signal, which in the case of FIG. 3 is the summation value 110-1, is a discharge curve of voltage that decreases during the integration phase. The comparator thus changes its output when this discharge curve becomes equal or lower than the global threshold value 108-1.

In relation to the general description above, the condition/criterion is the summation 110-1 passing the global threshold value 108-1. As noted above, the sample and hold circuit 106-1 is also controlled by a global signal, generated by the global control module 202, or by a local signal, that is generated when the second pulse indicating the end of the image acquisition phase (i.e. integration phase) is received via the line carrying the global clock signal 112 from the global control module 202, This local signal is generated to override the output of the comparator in the comparison circuit module 116-1 to store the voltages of the three photodiodes 104-1 and the timing signal V(t) at the end of the image acquisition phase even if the summation 110-1 has not crossed the global threshold value 108-1 during the image acquisition phase.

The sample and hold circuit 106-1 is thus instructed to store and capture voltage values for each of the photodiodes 104-1 either when the summation 110-1 crosses the global threshold value 108-1, or when the end of the image acquisition phase is reached.

When the sample and hold circuit 106-1 captures the voltage data for each of the photodiodes 104-1 and the timing signal V(t) 112-1, it may also be configured to send an end signal using the same line used to send the local feedback signal 110-1, back to the comparison circuit module 102-1 and associated circuitry of the sensor unit 100. This end signal triggers the local control module 102 including the comparison circuit module 102-1 and associated circuitry to send a reset/stop signal to the photodiodes 104-1, forcing them to enter a low-power/no-operation state until a new cycle is started in response to the first pulse being sent by the global control module 202.

The operation of the photoreceptor unit 100 according to FIG. 3 will now be explained in more detail. Firstly, during a low power/off state, or in other words, a reset phase, (RES=H), the photodiodes 104-1 are pre-charged to a voltage $V_r$. Once the first control signal is provided to the photodiodes 104-1 after reset, to begin the image acquisition phase, the photodiodes 104-1 start integrating incident light, causing voltage across each of the photodiodes 104-1 to drop almost linearly with the light intensity impinging on it, as described in the following expression:

$$V(k)=(I_K/C_K)t;\ \text{with } i=R,G,B; \qquad (1)$$

where $C_k$ is the reverse-biased photodiode capacitance, $I_k$ is the photo-generated current and t represents the photodiode exposure/integration time.

After the reset phase, and thus at the start of the image acquisition phase, the timing signal V(t) that forms part of the global clock signal 112-1 is activated, keeping track of the time elapsed since the start of the image acquisition phase. The voltages across the three photodiodes 104-1 are monitored by the comparison circuit module 102-1 which computes the summation 110-1 (S) of the three voltages received from each of the red 104-1a, green 104-1b, and blue 104-1c photodiodes as shown in (2) and compares it against the global threshold value 108-1 (TH):

$$S=(V_r-V_R)+(V_r-V_G)+(V_r-V_B). \qquad (2)$$

where $V_R$, $V_G$, and $V_B$ are the sampled voltages of the red 104-1a, green 104-1b, and blue 104-1c photodiodes respectively. During the exposure/integration time, the value of S starts increasing from zero, since the voltage at each of the photodiodes 104-1 decreases over time as it is discharged. At a time To, when the summation 110-1 (S) reaches the global threshold value 108-1 (TH), the sample and hold circuit 106-1, controlled by the comparison circuit module 102-1, stores the voltage signals of the red 104-1a, green 104-1b, and blue 104-1c photodiodes together with the voltage signal V(t) 112-1. At the end of operation, the photoreceptor unit 100 delivers the three signals, Rth, Gth and Bth, related to red 104-1a, green 104-1b, and blue 104-1c photodiodes respectively. These values are normalized against the global threshold value 108-1 TH:

$$R(\text{To})+G(\text{To})+B(\text{To})=Rth+Gth+Bth=TH. \qquad (3)$$

The fourth voltage signal Vth is related to the time (To) at which the signals have been stored by the sample and hold circuit 106-1. In this exemplary implementation, the global threshold value 108-1 (TH) acts as a global signal to set the local exposure time of the photodiodes and thus pixels of the array 200, while the local parameter is represented by the summation 110-1 (S). The second global signal is the timing signal V(t), the voltage ramp/curve whose value is stored in the sample and hold circuit 106-1 as To and represents the pixel timestamp.

Once the image acquisition phase is over, the values stored at the sample and hold circuit 106-1 are output via the sensor unit output 114 and are subject to readout in the readout phase. The readout phase obtains all sensor unit outputs 114 from each of the photoreceptor units 100a to 100n such that RGB values from each pixel in the array 200, for an entire scene, are made available for post-processing or other final use. In addition to the RGB values, values for $V(T_o)$ are acquired, indicating the time To at which the global threshold value 108-1 (TH) was passed for each respective photoreceptor unit 100. With knowledge of the V(To), each set of RGB values corresponding to a photoreceptor unit 100 can be used to compute the absolute RGB values for each photoreceptor unit 100. The absolute RGB values can be computed using the formula:

$$\Delta V_x*T_i/T_0 \text{ where } \Delta V_x=(V_r-V_x) \qquad (4)$$

Where x=R, G or B such that $V_x$ corresponds to the RGB voltage values obtained from the sensor unit outputs 114, and where $T_i$ is the global integration/exposure time. To can be computed by inverting the timing signal V(To) as explained above. This allows the array 200 and any apparatus incorporating it to discern useful colour information in both bright and dark areas of a scene. For example, in a dark area of a scene, captured by a first photoreceptor unit 100, the value of the timing signal $V(T_o)$ may be relatively large, meaning a longer amount of time $T_0$ was needed for the summation 110-1 (S) to reach the global threshold value 108-1 (TH). In a bright area of the same scene, captured by a second photoreceptor 100, the value of the timing signal $V(T_o)$ may be relatively small, meaning a shorter amount of time $T_0$ was needed for the summation 110-1 (S) to reach the global threshold value 108-1 (TH). By normalizing these values using the different values of $T_0$ returned by each photoreceptor in the sensor array, it is possible to obtain an image with RGB values that represent truthfully the full dynamic range of the light conditions present in the scene even in the simultaneous presence of very bright and very dark areas.

Figure 4:
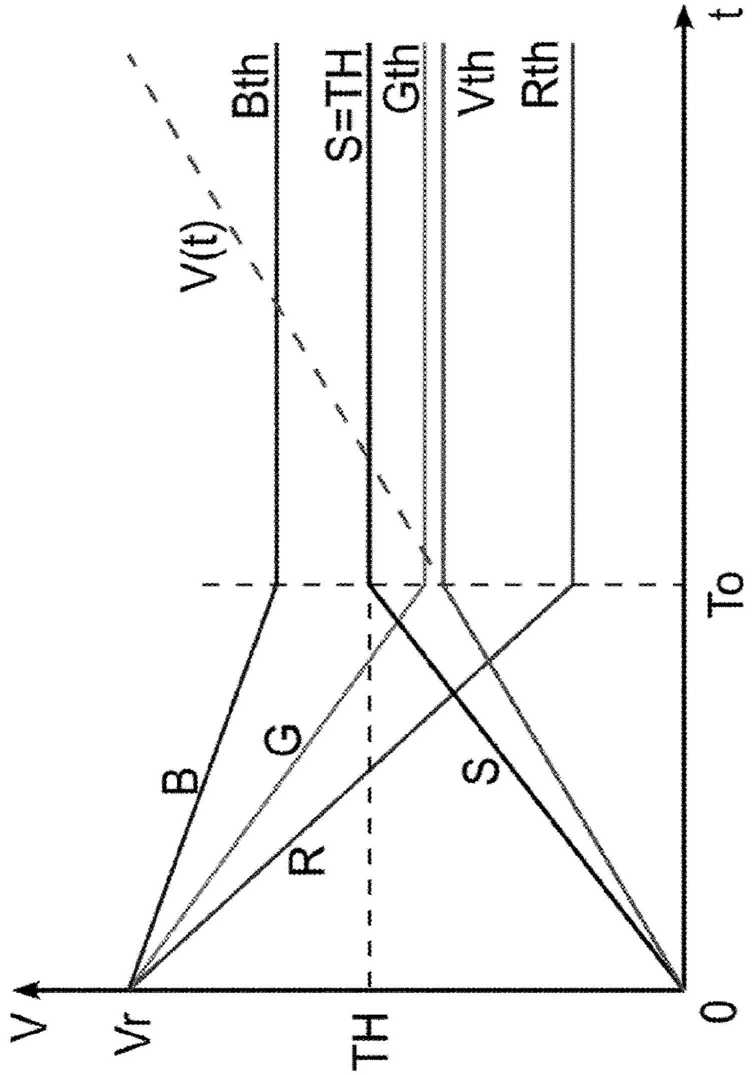
FIG. 4 is a timing diagram illustrating the principle of operation of the circuit depicted in FIG. 3.

FIG. 4 shows a timing graph illustrating the process described above with reference to FIG. 3. In particular, after the reset phase, each of the red 104-1*a*, green 104-1*b*, and blue 104-1*c* photodiodes are set to an initial voltage V(r). When the image acquisition phase begins, the timing signal V(t) carried by/on the line of the global clock signal 112-1 is initiated, and the voltage at each of the photodiodes 104-1 begins to discharge in a substantially linear fashion according to equation 1 above, as indicated by the R, G and B lines in FIG. 4. At the same time, the summation 110-1 (S), calculated according to equation 2 above, increases according to the sum of the magnitudes of decrease in voltage in the RGB voltage values. At the time $T_0$, the summation 110-1 S reaches the global threshold value 108-1 TH. At this moment in time ($T_o$), the sample and hold circuit 106-1 is instructed by the comparison circuit module 102-1 to capture and store the R, G and B voltage values from the red 104-1*a*, green 104-1*b*, and blue 104-1*c* photodiodes respectively. These values are indicated by Rth, Gth, and Bth lines in FIG. 4. At the same time, the sample and hold circuit 106-1 also stores the value of the timing signal V(t) at $t=T_0$, indicated as the line Vth in FIG. 4. Each of the values Rth, Gth, Bth and Vth then from part of the sensor unit output 114, which is subject to readout in the readout phase following the image acquisition phase.

Figure 5:
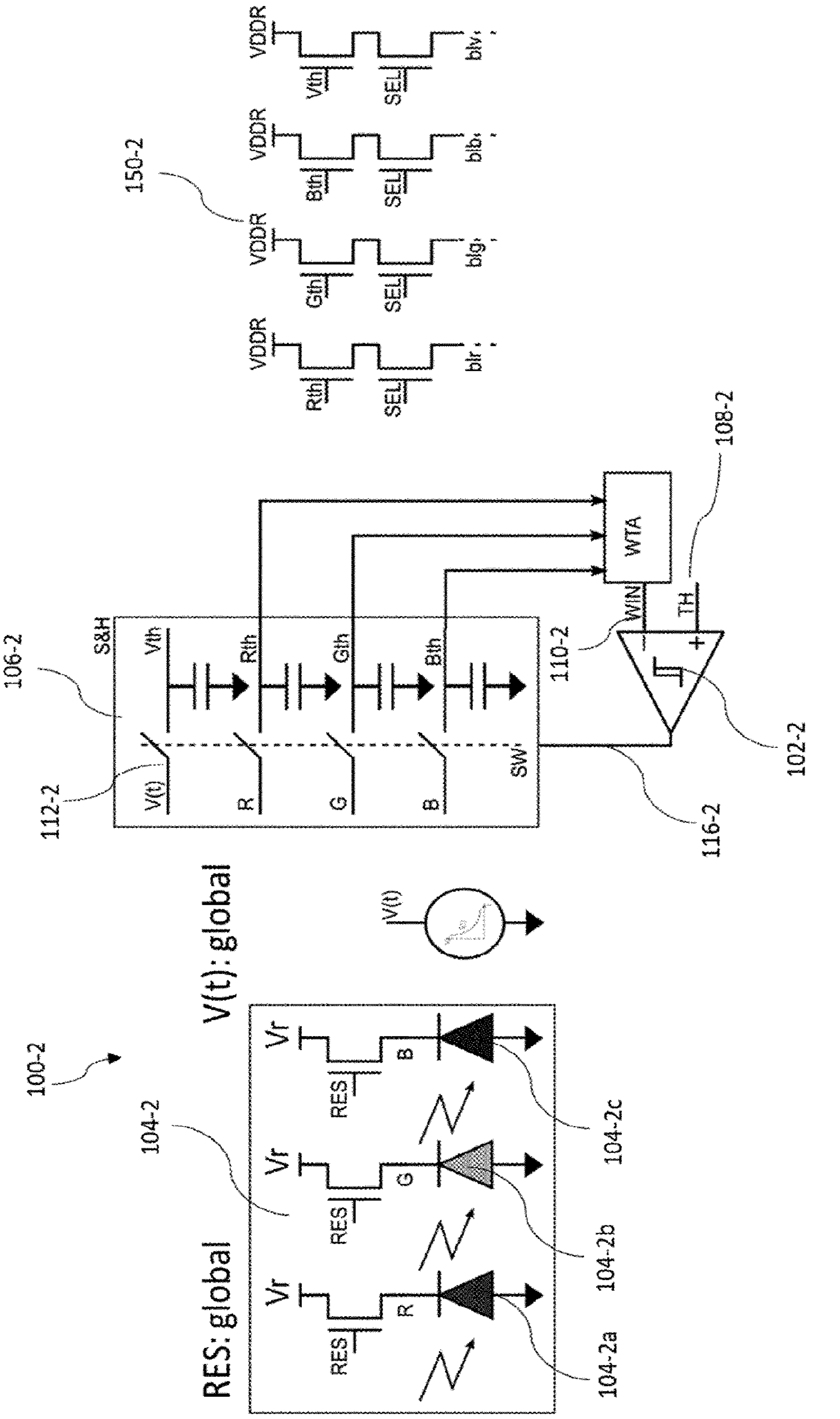
FIG. 5 is a schematic diagram illustrating a colour-intensity function of a photoreceptor unit according to an embodiment of the present invention.

FIG. 5 is a schematic diagram showing a second exemplary implementation of the photoreceptor unit 100-2. In this implementation, the local control module 102 is a comparison circuit module 102-2, the photosensitive elements 104 are a group of photodiodes 104-2, including: a red light sensitive photodiode 104-2*a*, a green light photosensitive diode 104-2*b*, and a blue light photosensitive diode 104-2*c*. The memory module 106 is a sample and hold circuit 106-2, the global feedback signal 108 is a global threshold value 108-2, the local feedback signal 110 is a winner-takes-all signal 110-2 of the sensor outputs from the photodiodes 104-1, and the timing signal V(t) 112-2 is a signal carried by the global clock signal line and is a function of time. The sensor unit output 114 is not shown but is also described below.

FIG. 5 also shows circuits 150-2 that may be used during the readout phase. In particular, when a particular photoreceptor unit 100 in a position (i,j) of the sensor array 200 must be read, the selection SEL signal corresponding to that photoreceptor unit 100 is asserted so that the Rth, Gth, Bth and Vth signals from corresponding line buffers, depicted as transistors in FIG. 5, connected to the supply voltage VDDR, are copied to the corresponding bit-lines blr, blg, blb and blv. These bit lines are grouped with those of other photoreceptor units of the same array 200, and are typically arranged in a column.

In operation of the second exemplary implementation of the photoreceptor unit 100, according to FIG. 5, during the image acquisition phase, the voltages of the red 104-2*a*, green 104-2*b*, and blue 104-2*c* photodiodes are sampled at the sample and hold circuit 106-2 and subjected to a winner-takes-all operation at a winner-takes-all node (WTA), wherein the signal from the photodiodes 104-2 with the greatest change in voltage from its initial reset voltage V(r) is passed to the comparison circuit module 102-2. The 'winning' voltage signal forms the local feedback signal 110-2. Thus, the local feedback signal 110-2 is effectively equivalent to the voltage signal of the one out of the red 104-2*a*, green 104-2*b*, and blue 104-2*c* photodiodes that exhibits the greatest change since reset. This local feedback signal 110-2 is fed into the comparison circuit module 102-1. The global threshold value 108-2 is also fed into the comparison circuit module 102-2. The comparison circuit module 102-2 compares the winner-takes-all signal 110-2 with the global threshold value 108-2 using a comparator. As described above, the WTA node is a circuit that compares the three photodiodes' 104-2 voltage signals and sends or copies to the output of the WTA node the photodiode voltage signal with the greatest change (i.e., the voltage of the photodiode that is discharging faster) and this forms the local feedback signal 110-2. The combination of the WTA node with the comparator 102-2 is equivalent to a circuit that compares simultaneously all the input signals against the global threshold value 108-2.

Once the output of the winner-takes all 110-2 is reaches or crosses the global threshold value 108-2, the comparison circuit module 102-2 sends the second control signal discussed above along the line 116-2 as illustrated in FIG. 5. This second control signal controls the sample and hold circuit 106-2 to store the current values of voltages for the red 104-2*a*, green 104-26, and blue 104-2*c* photodiodes, as well as the voltage value for the voltage signal V(t) 112-2. This is done by, for example, opening the switches in the sample and hold circuit 106-2 illustrated in FIG. 5 to store voltage values for each of the corresponding signals. The action of the comparison circuit module 102-2 when the global threshold 108-2 is crossed is thus what is responsible for initiating capture of the sensor data. In relation to the general description above, the condition/criterion is the winner-takes-all local feedback signal 110-2 passing the global threshold value 108-2. Apart from this, the features of the second exemplary implementation illustrated in FIG. 5 are similar or equivalent to those of the first exemplary implementation as shown in FIG. 3. This is also true in relation to the fact that the sample and hold circuit 106-2 also forms part of the local control module 102. The local control module 102 is controlled by a global signal, generated by the global control module 202 of the array 200, or by a local signal, that is generated when the second pulse generated by the global control module 202 is received locally through the global clock line, to override the output of the comparator of the comparison circuit module 102-2 and store the voltages of the three photodiode and the timing signal V(t) on the end of the image acquisition phase if the "winning" signal 110-1 has not crossed the threshold 108-2 during the image acquisition phase.

When the sample and hold circuit 106-2 captures the voltage data for each of the photodiodes 104-2 and the voltage signal V(t) 112-2, it may also be configured to send an end signal using the same line used to send the local feedback signal 110-2, back to the local control module 102 including the comparison circuit module 102-2 and associated circuitry of the sensor unit 100. This end signal triggers the local control module 102 comparison circuit module 102-2 and associated circuitry to send a reset/stop signal to the photodiodes 104-2, forcing them to enter a low-power/no-operation state until a new cycle is started.

The operation of the photoreceptor unit 100 according to FIG. 5 will now be explained in more detail. Firstly, during a low power/off state, or in other words, a reset phase, (RES=H), the three photodiodes 104-2 are pre-charged to the voltage $V_r$. After the reset has been released, from the first control signal, the image acquisition phase begins. This causes the three photodiodes 104-2 to start integrating light as explained above with reference to FIGS. 4 and 5. The voltage across each photodiode 104-2 starts dropping almost linearly with the light intensity impinging on it. After the reset, the voltage signal V(t) 112-2 is activated, keeping track of the time elapsed since the end of the reset phase and thus beginning of the image acquisition phase. The comparison circuit module 102-2 monitors the three photodiode voltages during the exposure time. As soon as one of the three signals (R, G, B voltages) reaches the global threshold value 108-2 (Vth), the voltage signals R, G, B of the red 104-2*a*, green 104-2*b*, and blue 104-2*c* photodiodes, together with the voltage signal 112-2 V(t) are stored by the sample and hold circuit 106-2. The photoreceptor unit 100, depicted in FIG. 5, implements a Winner-Take-All (WTA) operation among the three photodiodes 104-2. This means that the brightest photodiode is the first one reaching the global threshold value 108-2 (Vth). The other two non-winner voltage signals avoid saturation, since their voltage levels are always larger than TH. The three signals from the photodiodes 104-2 (Rth, Gth, Bth) are stored and are used to form the sensor unit output 114. These signals are not normalized. In particular, assuming R (red) to be the brightest signal, Rth is equal to the global threshold value 108-2 (TH). The pixel timestamp is represented by Vth. Like in the first exemplary implementation of FIG. 3, with the knowledge of $V(T_o)$, i.e., the timing signal V(t) when the global threshold value 108-2 is reached by the WTA output signal (local feedback signal 110-2), each set of RGB values corresponding to a photoreceptor unit 100 can be used to compute the absolute RGB values for each photoreceptor unit 100. In fact, the absolute RGB values can be computed using equation 4 as noted above.

Figure 6:
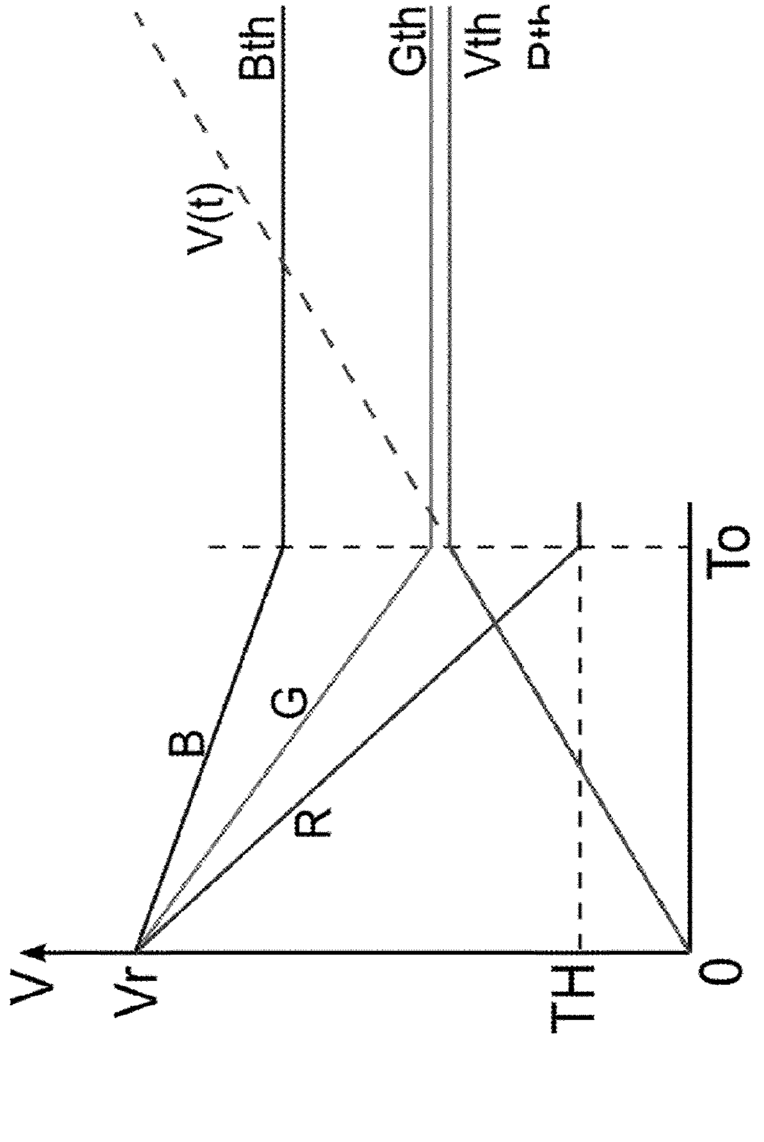
FIG. 6 is a timing diagram illustrating the principle of operation of the circuit depicted in FIG. 5.

FIG. 6 shows a timing graph illustrating the process described above with reference to FIG. 5. In particular, after the reset phase, each of the red 104-2*a*, green 104-2*b*, and blue 104-2*c* photodiodes are set to an initial voltage VI. When the image acquisition phase begins, the global clock signal represented by the timing signal V(t) is initiated, and the voltage at each of the photodiodes 104-2 begins to discharge in a substantially linear fashion according to equation 1 above, as indicated by the R, G and B lines in FIG. 6. At the time $T_0$, the winning signal reaches the global threshold value 108-2 TH. In the example of FIG. 6, the winning signal is the red signal R. At this moment in time ($T_0$), the sample and hold circuit 106-2 is instructed by the comparison circuit module 102-2 to capture and store the R, G and B voltage values from the red 104-2*a*, green 104-2*b*, and blue 104-2*c* photodiodes respectively. These values are indicated by Rth, Gth, and Bth lines in FIG. 6. At the same time, the sample and hold circuit 106-1 also stores the value of V(t) at $t=T_0$, indicated as the line Vth in FIG. 6. Each of the values Rth, Gth, Bth and Vth then from part of the sensor unit output 114 which is subject to readout in the readout phase.

Figure 6A:
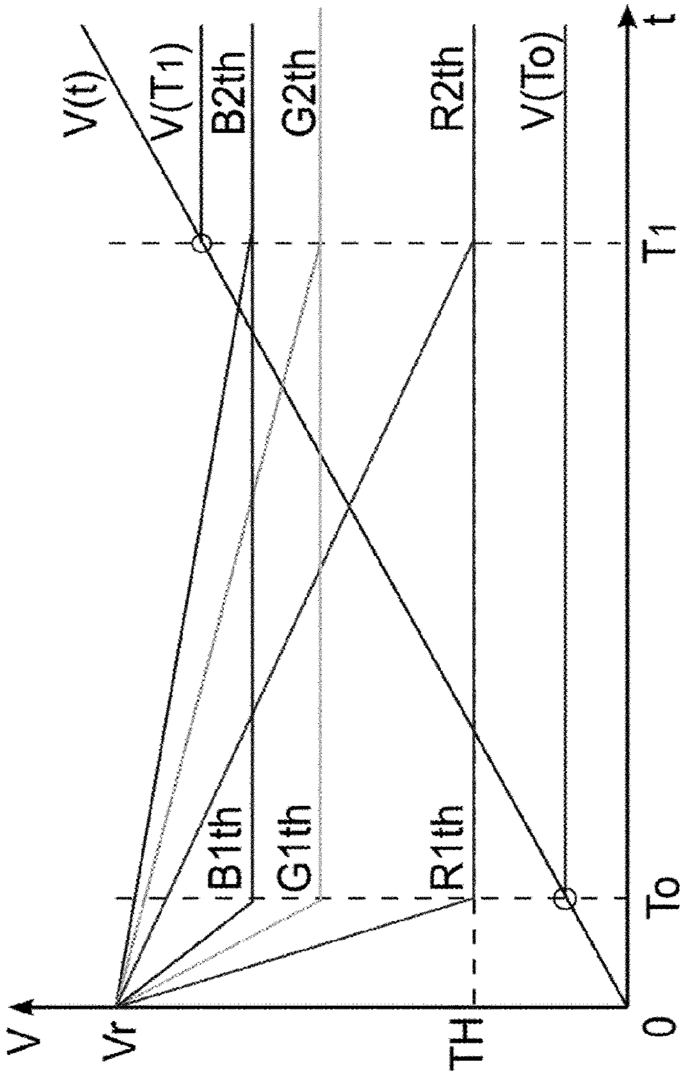
FIG. 6*a* is a timing diagram illustrating the principle of operation of the circuit according to various embodiments at different times.

The second exemplary implementation of the photoreceptor unit 200 illustrated by FIGS. 5 and 6 is advantageous, if compared with the standard techniques, because it prevents the photodiodes 104-2 experiencing saturation through a local mechanism regardless of their lighting level. This characteristic is depicted in FIG. 6*a*, which shows an example of two photoreceptors 100-2 of the same type, with the same chromatic components, but under different intensity conditions. In particular, a first of the two photoreceptors is brighter than the second. The first photoreceptor is associated with the values R1*th*, G1*th*and B1*th*and the second photoreceptor is associated with the values R2*th*, G2*th*and B2*th*. In both of the first and second photoreceptors, R is the dominant chromatic component, and a such the R values for each of the first and second photoreceptors reaches the threshold TH first through the winner-takes-all. This triggers the sample and hold circuit to store the signals: R1*th*, G1*th*, B1*th*, and the timing signal V(T0) for the first photoreceptor and R2*th*, G2*th*, B2*th*, and the timing signal V(T1) for the second photoreceptor. In this case, the time taken for the second receptor to have a value for RGB reach the threshold TH is greater than the time taken for the first photoreceptor, such that T1>T0. In other words, the first photoreceptor is subject to brighter light than the second photoreceptor. The ratio T1/To is directly proportional to the ratio of the light intensities impinging on the two photoreceptors. Moreover, it can be seen that the relationship among the two triplets R1*th*, G1*th*, B1*th*and R2*th*, G2*th*, B2*th*is the same. This means that the chromatic information of both the first and second photoreceptors is preserved regardless their different light intensities which is coded by V(T0) and V(T1). Thus, even though the first photoreceptor is subject to much brighter light than the second photoreceptor, RGB information can be obtained easily for both, such that true colour information is easily comparable for both photoreceptors. Therefore, only the four signals R, G, B, V(T) are necessary to retrieve the absolute information of each photoreceptor over a wide dynamic range.

Figure 7:
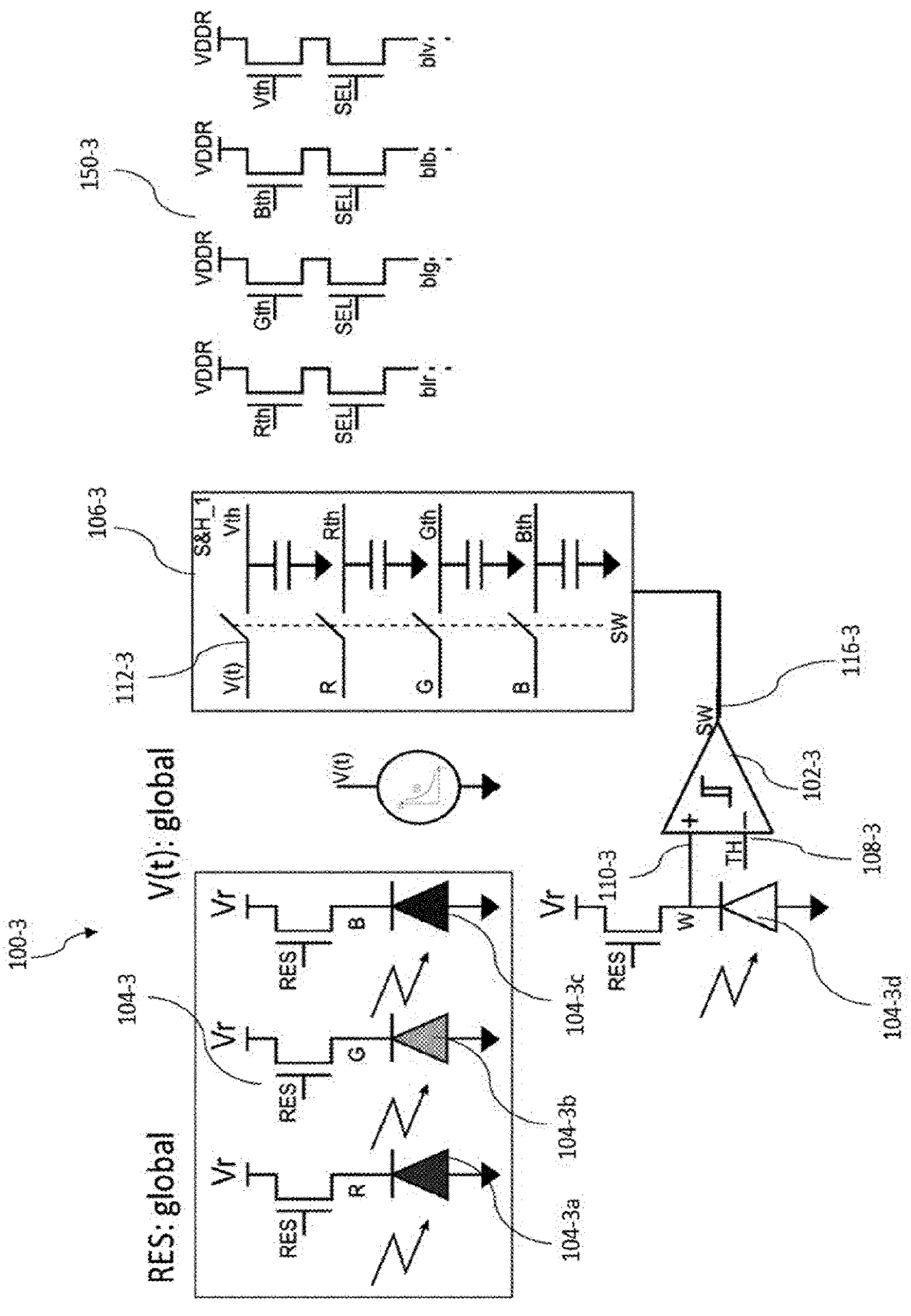
FIG. 7 is a schematic diagram illustrating a light-intensity-invariant function of a photoreceptor unit according to an embodiment of the present invention.

FIG. 7 is a schematic diagram showing a third exemplary implementation of the photoreceptor unit 100-3. In this implementation, the local control module 102 includes a comparison circuit module 102-3, the photosensitive elements 104 are a group of photodiodes 104-3, including: a red light sensitive photodiode 104-3*a*, a green light photosensitive diode 104-3*b*, a blue light photosensitive diode 104-3*c* and additionally a further photodiode 104-3*d* sensitive to white light. The memory module 106 is a sample and hold circuit 106-3, the global feedback signal 108 is a global threshold value 108-3, and the global clock signal is a voltage signal V(t) 112-3 that is a function of time. The sensor unit output 114 is not shown but is also described below. This third exemplary implementation is different from the first and second exemplary implementations described above in that the local feedback signal 110 is not sampled or directly taken from any of the red light sensitive photodiode 104-3*a*, green light photosensitive diode 104-3*b*, or blue light photosensitive diode 104-3*c*. Instead, the further photodiode 104-3*d* is used. The further photodiode 104-3*d* is sensitive to white light, and its voltage is sampled to form the local feedback signal 110-3.

FIG. 7 also shows circuits 150-3 that may be used during the readout phase. In particular, when a particular photoreceptor unit 100 in a position (i,j) of the sensor array 200 must be read, the selection SEL signal corresponding to that photoreceptor unit 100 is asserted so that the Rth, Gth, Bth and Vth signals from corresponding line buffers, depicted as transistors in FIG. 7, connected to the supply voltage VDDR, are copied to the corresponding bit-lines blr, blg, blb and blv. These bit lines are grouped with those of other photoreceptor units of the same array 200, and are typically arranged in a column.

The operation of the third exemplary implementation of the photoreceptor unit 100-3 is the same as the operation of the first and second exemplary implementations described above, apart from the presence of the white light photosensitive diode 104-3*d*. During the image acquisition phase, the voltages of the red 104-3*a*, green 104-3*b*, and blue 104-3*c* photodiodes are not sampled directly and only the white light photosensitive diode 104-3*d* is sampled to provide the local feedback signal. The white light photosensitive diode 104-3*d* voltage 110-3 is fed into the comparison circuit module 102-3. The global threshold value 108-3 is also fed into the comparison circuit module 102-3. The comparison circuit module 102-3 compares the white light photosensitive diode 104-3*d* signal 110-3 with the global threshold value 108-3 using a comparator. Once the white light photosensitive diode 104-3*d* signal 110-3 110-3 reaches or crosses the global threshold value 108-3, the comparison circuit module 102-3 sends the second control signal discussed above along the line 116-3 as illustrated in FIG. 3. This second control signal controls the sample and hold circuit 106-3 to store the current values of voltages for the red 104-3*a*, green 104-3*b*, and blue 104-3*c* photodiodes, as well as the voltage value for the voltage signal V(t) 112-3. Optionally, the voltage value for the white light photodiode 104-3*d* is also stored. This is done by, for example, opening the switches in the sample and hold circuit 106-3 illustrated in FIG. 7 to store voltage values for each of the corresponding signals. The action of the comparison circuit module 102-3 when the global threshold 108-3 is crossed is thus what is responsible for initiating capture of the sensor data. In relation to the general description above, the condition/criterion is the white light photosensitive diode 104-3*d* signal 110-3 passing the global threshold value 108-3. Like in the first and second exemplary implementations above, the sample and hold circuit 106-3 is also controlled by a global control signal, generated by the global control module 202, or by a local signal, that is generated at the end of the image acquisition phase (end of the integration phase) in response to the second pulse generated by the global control module 202. As noted above the second pulse is received locally through the global clock line, to override the output of the comparator 116-3 and store the voltages of the three photodiode and the timing signal V(t) at the end of the acquisition phase even if the white signal 110-3 has not crossed the threshold 108-2 during the image acquisition phase.

When the sample and hold circuit 106-3 captures the voltage data for each of the photodiodes 104-3 and the voltage signal V(t) 112-3, it may also be configured to send an end signal using the same line used to send the local feedback signal 110-3, back to the comparison circuit module 102-3 and associated circuitry of the sensor unit 100. This end signal triggers the comparison circuit module 102-3 and associated circuitry to send a reset/stop signal to the photodiodes 104-3, forcing them to enter a low-power/no-operation state until a new cycle is started.

During the reset phase (RES=H) of the photoreceptor 100-3, the four photodiodes 104-3 including the white light photosensitive diode 104-3*d* are pre-charged to the voltage $V_r$. After the reset has been released (RES=L), the four photodiodes 104-3 start integrating light and the voltage across each photodiode starts dropping almost linearly with the light intensity impinging on it, as explained above. The spectral response of the white light photosensitive diode 104-3*d* can be approximated to the integral of the spectral response of red 104-3*a*, green 104-3*b*, and blue 104-3*c* photodiodes. Therefore, it can be assumed that the voltage of the white photosensitive diode 104-3*d* reaches the global threshold value 108-3 TH when a summation of the signals of the red 104-3*a*, green 104-3*b*, and blue 104-3*c* photodiodes would also reach the global threshold value 108-3 TH. The third exemplary implementation is thus similar to the first exemplary implementation as described above with reference to FIG. 3, except this third implementation attempts to replicate the operation of the first implementation without directly sampling the red 104-3*a*, green 104-3*b*, and blue 104-3*c* photodiodes, by instead using the white light photosensitive diode as a approximate "physical adder" of the Red, Green and Blue components of the incident light. Finally, like in the first and second exemplary implementation, with the knowledge of $V(T_0)$, i.e., V(t) when the threshold 108-3 is reached by the white signal 110-3, each set of RGB values corresponding to a photoreceptor unit 100-3 can be used to compute the absolute RGB values for each photoreceptor unit 100, according to equation 4.

Figure 8:
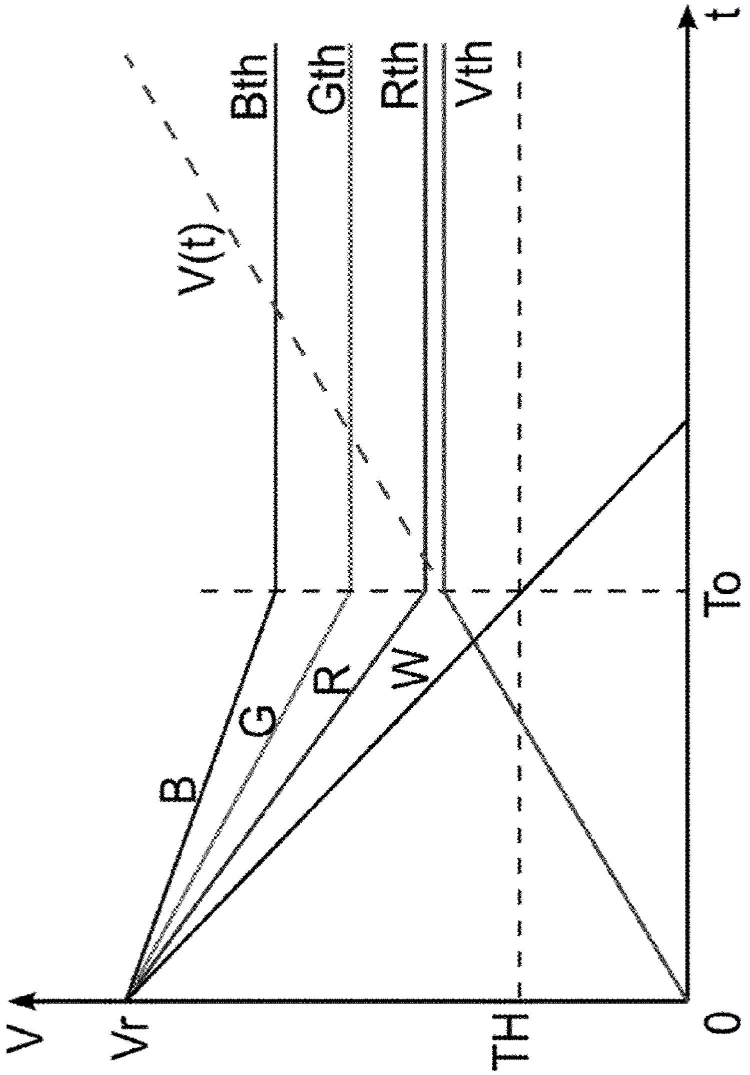
FIG. 8 is a timing diagram illustrating the principle of operation of the circuit depicted in FIG. 7.

FIG. 8 shows a timing graph illustrating the process described above with reference to the third exemplary implementation and FIG. 7. In particular, after the reset phase, each of the red 104-3*a*, green 104-3*b*, blue 104-3*c* and white 104-3*d* photodiodes are set to an initial voltage V(r). When the image acquisition phase begins, the global clock signal represented by the voltage signal V(t) is initiated, and the voltage at each of the photodiodes 104-3 begins to discharge in a substantially linear fashion according to equation 1 above, as indicated by the R, G, B and W lines in FIG. 8. At the time $T_0$, the white 104-3*d* photodiode signal 110-3 reaches the global threshold value 108-3 TH. At this moment in time ($T_0$), the sample and hold circuit 106-3 is instructed by the comparison circuit module 102-3 to capture and store the R, G and B voltage values from the red 104-3*a*, green 104-3*b*, and blue 104-3*c* photodiodes respectively. These values are indicated by Rth, Gth, and Bth lines in FIG. 8. At the same time, the sample and hold circuit 106-1 also stores the value of V(t) at $t=T_0$, indicated as the line Vth in FIG. 8. Each of the values Rth, Gth, Bth and Vth then from part of the sensor unit output 114 which is subject to readout in the readout phase.

Using a white light photosensitive diode 104-3*d* instead of red 104-3*a*, green 104-3*b*, and blue 104-3*c* photodiodes can be advantageous, because the red 104-3*a*, green 104-3*b*, and blue 104-3*c* photodiodes are not subject to any manipulation in the local feedback loop prior to being stored by the sample and hold circuit 106-3 to form part of the sensor unit output signal 114. In fact, the red 104-3*a*, green 104-3*b*, and blue 104-3*c* photodiodes are not disturbed by the sampling activity of the WTA module as in FIG. 5 or of the summation node as in FIG. 3. That can result in a better accuracy of the stored values of the signals generated by the red 104-3*a*, green 104-3*b*, and blue 104-3*c* photodiodes and, therefore, in a more accurate representations of the RGB values of a scene.

Figure 9:
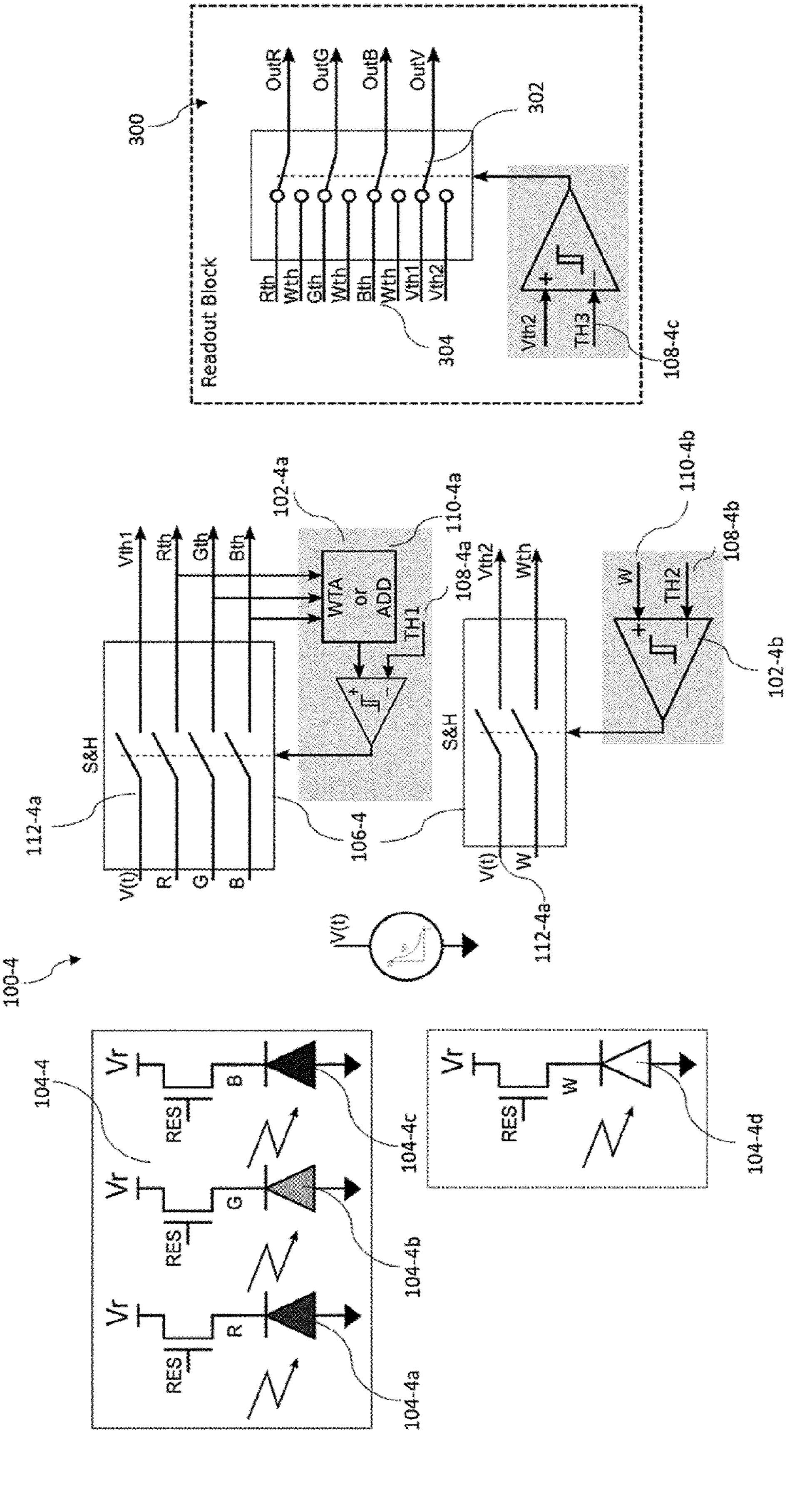
FIG. 9 is a schematic diagram of a further exemplary circuit according to embodiments of the invention.

FIG. 9 is a schematic diagram showing a fourth exemplary implementation of the photoreceptor unit 100-4. This fourth implementation is effectively a combination of features from the first, second and third exemplary implementations set out above. In the fourth exemplary implementation, the local control module 102 includes a first comparison circuit module 102-4*a*, and a second comparison circuit module 102-4*b*. Although drawn separately it is noted that the first and second comparison circuit modules 102-4*a* and 102-4*b* may be implemented in the same circuital block part of the local control module 102. The photosensitive elements 104 are a group of photodiodes 104-4, including: a red light sensitive photodiode 104-4*a*, a green light photosensitive diode 104-4*b*, a blue light photosensitive diode 104-4*c*, and a high-sensitivity white light photosensitive diode 104-4*d*. The white light photosensitive diode 104-4*d* is a wide-spectrum photosensor. The memory module 106 includes a sample and hold circuit 106-4.

The first comparison circuit module 102-4*a* of the local control module 102 functions in the same way as described with reference to the first and second exemplary implementations above. In particular, a first local feedback signal 110-4*a* from the sample and hold circuit 106-4 includes either a summation of the RGB voltage values from the photodiodes 104-4, (as in the first exemplary implementation), or a winner-takes-all WTA signal of the RGB values (as in the second exemplary implementation). This first local feedback signal 110-4*a* is compared to a first global threshold 108-4*a* at a comparator in the first comparison circuit module 102-4*a*. When the first global threshold 108-4*a* is met, the first comparison circuit module 102-4*a* of the local control module 102 is configured to instruct the sample and hold circuit in 106-4 to store the R, G, B signals and a first value of the global timing signal 112-4*a*. In FIG. 9, these values are denoted by stored RGB values Rth, Gth and Bth, and the stored first timing signal value Vth1.

The second comparison circuit module 102-4*b* functions in the same way as described with reference to the third exemplary embodiment. In particular, a second local feedback signal 110-4*b* is the value of the white photosensitive diode 104-4*d*. This value is compared to a second global threshold 108-4*b* at a comparator included in the second comparison circuit module 102-4*b* part of the local control module 102. The white light photosensitive diode may be a high sensitivity "white" photodiode such as a pinned photodiode or a single photon detector or other CMOS-compatible, high-sensitivity photodetector. When the second global threshold 108-4*b* is met, the second comparison circuit module 102-4*b* of the local control module 102 is configured to instruct the sample and hold circuit 106-4 to store the W value and a second value of the timing signal 112-4*a*. In FIG. 9, these values are denoted by stored W value Wth, and the stored second timing signal value Vth2.

It is thus to understood that more than one global threshold can be used to compare data against for each photoreceptor unit 100-4.

The operation of the fourth exemplary implementation is the same as the first, second and third exemplary implementations as discussed above. At the end of the image acquisition phase (integration phase), the sample and hold circuit 106-4 stores or will have stored the values Rth, Bth and Gth of the red, green, and blue photodiode voltages together with the first value Vth1 of the timing signal V(t) 112-4*a* indicative of the time when the first local feedback signal 110-4*a*, corresponding to the combination of R,G,B signals, (subject to the summation or WTA) crosses the first global threshold 108-4*a*. Alternatively the first value Vth1 of the timing signal 112-4*a* will indicate a time at the end of the image acquisition phase (end of the integration phase) if the first global threshold 108-4*a* is not crossed during the allocated maximum exposure period. The sample and hold circuit 106-4 will also store or have stored the value Wth of the voltage of the white light sensitive photodiode 104-4*d* together with the second value Vth2 of the timing signal V(t) 112-4*a* at the time when the second local feedback signal 110-4*b* corresponding to the voltage of the white light photosensitive diode crosses the second global threshold 108-4*b*, or at the end of the integration phase if the second global threshold 108-4*b* is not crossed before the end of image acquisition.

The sample and hold circuit will then ultimately have stored six values: the R, G, B signals Rth, Gth, Bth and W signal Wth for the four photodiodes 104-4 and 104-4*d*, the first value Vth1 of the timing signal 112-4*a* and the second value Vth2 for the timing signal 112-4*a*. These values can be transferred out of the photoreceptor unit 100-4 as a photoreceptor unit output during the readout phase and made available to an external computer or memory for example.

In general, the readout circuitry, is configured to transfer the photoreceptor outputs to the external units/devices/applications and reads all the photoreceptor units 100-4 of the sensor array 200 in sequence or with some level of parallelism and sends the data to an external application using a suitable I/O channel that is connected to the photoreceptor units 100-4 and, in particular, to the sample and hold circuit 106-4.

A first example of readout block 300 is illustrated in FIG. 9. The readout block 300 includes a logic circuit with six inputs corresponding to the six values Rth, Bth, Gth, Wth, Vth1 and Vth2 obtained during the image acquisition phase. The readout block 300 may be implemented by one or more circuits designed and implemented to filter the six values Rth, Bth, Gth, Wth, Vth1 and Vth2 generated by each photoreceptor unit 100-4 to reduce the bandwidth needed to transfer such data to an external computer, memory, or application. The logic implemented in the readout block 300 can decide to send only the R, G, B photodiode values Rth, Gth, Bth with the corresponding first value Vth1 of the timing signal 112-4*a* V(t) or to send only the W photodiode value Wth with the corresponding second value Vth2 of the timing signal 112-4*a* V(t) according to the result of a comparison operation.

The readout block 300 is activated during the readout phase after the end of the image acquisition/integration phase, when the six values stored by the sample and hold circuit 106-4 are all available. During this readout phase, the following process occurs in the readout block 300. Firstly, if the second value Vth2 of the timing signal 112-4*a*, that defines the time when the second local feedback signal 110-4*b* corresponding to the voltage W of the white light photosensitive diode 104-4*d*, reaches the second global threshold 108-4*b*, or the time when the end of the integration phase was reached by the white light photosensitive diode 104-4*d* without crossing the second global threshold 108-4*b*, is lower than a third global threshold 108-4*c*, then a plurality of switches 302 in the readout block 300 are configured to connect respective output lines OutR, OutG, OutB and OutV to input lines 304 corresponding to the R, G, B photodiode voltage values Rth Bth and Gth stored by the sample and hold circuit 106-4, and the value Vth1 of the first timing signal 112-4*a*. Otherwise, if the second value Vth2 of the timing signal 112-4*a* is greater than the third global threshold value 108-4*c*, the switches are configured to connect the output lines OutR, OutG, OutB to the input line 304 corresponding to the value Wth for the white light photosensitive diode 104-4*d* stored by the sample and hold circuit 106-4, while the output line OutV is connected to the second value Vth2 of the timing signal 112-4*a*. The input line 304 corresponding to the value Wth is connected at three points in the readout block 300 such that the plurality of switches may each switch between the value Wth and one of the Rth, Gth, and Bth values respectively.

Since the white light photosensitive diode 104-4*d* is more sensitive than the red, green and blue light photosensitive diodes 104-4*a*, 104-4*b*, 104-4*c*, the second local feedback signal 110-4*b* is more likely to reach and meet the second global threshold value 108-4*b* at a time before the first local feedback signal 110-4*a* corresponding to the WTA or summation value of the RGB photodiodes 104-4 is likely to reach the first global threshold 108-4*a*. Therefore, the second value Vth2 of the timing signal 112-4*a* is selected for comparison with the third global threshold value 108-4*c* using a comparator, rather than the first value Vth1 of the timing signal 112-4*a*.

When the intensity of the light incident to the photoreceptor unit 100-4 is very low, for instance, when a dark area of a scene is being observed, the discharge speed of the red, green and blue light photosensitive diodes 104-4*a*, 104-4*b*, 104-4*c* is low, and there is even a high probability that the first global threshold 108-4*a* will not be reached within the image acquisition phase and thus in the allocated maximum exposure time. However, the discharge speed of the white light photosensitive diode 104-4*d* is always faster because this photosensitive diode is more sensitive and, as such, there is a higher probability that the second global threshold value 108-4*b* will be reached within the image acquisition phase.

The third global threshold value 108-4*c*, used in the readout block 300, is useful for determining the best set of output signals OutR, OutB, and OutG in terms of quality or signal-to-noise ratio. If the second value Vth2 of the timing signal 112-4*ab* stored by the sample and hold circuit 106-3 passes the third global threshold 108-4*c*, this means that the intensity of the incident light is very low, and the readout block 300 will send out the OutR, OutB, OutG using the Wth value collected by the more sensitive white photodiode. Thus, under low light conditions, the OutR, OutG and OutB values are all equal to the value Wth, which means that the colour information is lost, and the final image will be a grey-level picture. On the contrary, when the intensity of the incident light is not low, the readout block 300 will send out the OutR, OutB, OutG collected by the colourful set of R, G, B photodiodes 104-4*a*, 104-4*b*, and 104-4*c*. In both cases the OutV value produced by the readout block 300 contains the timing signal V(t) 112-4*a* sampled when the corresponding set of signals have been sampled. In other words, in the presence of bright incident light OutR, OutG and OutB will contain a colourful representation of the incident light corresponding to the stored values Rth, Gth and Bth, and OutV will provide the first value Vth1 of the timing signal 112-4*a* sampled when the first global threshold value 108-4*a* was reached by the output of the summation or WTA circuits 110-4*a*. In presence of dark incident light OutR, OutG and OutB will provide a grey-level representation of the incident light corresponding to the stored value Wth and OutV will provide the second value Vth2 of the timing signal 112-4*a* sampled when the second global threshold value 108-4*b* was reached by the output of the white photodiode.

Figure 10:
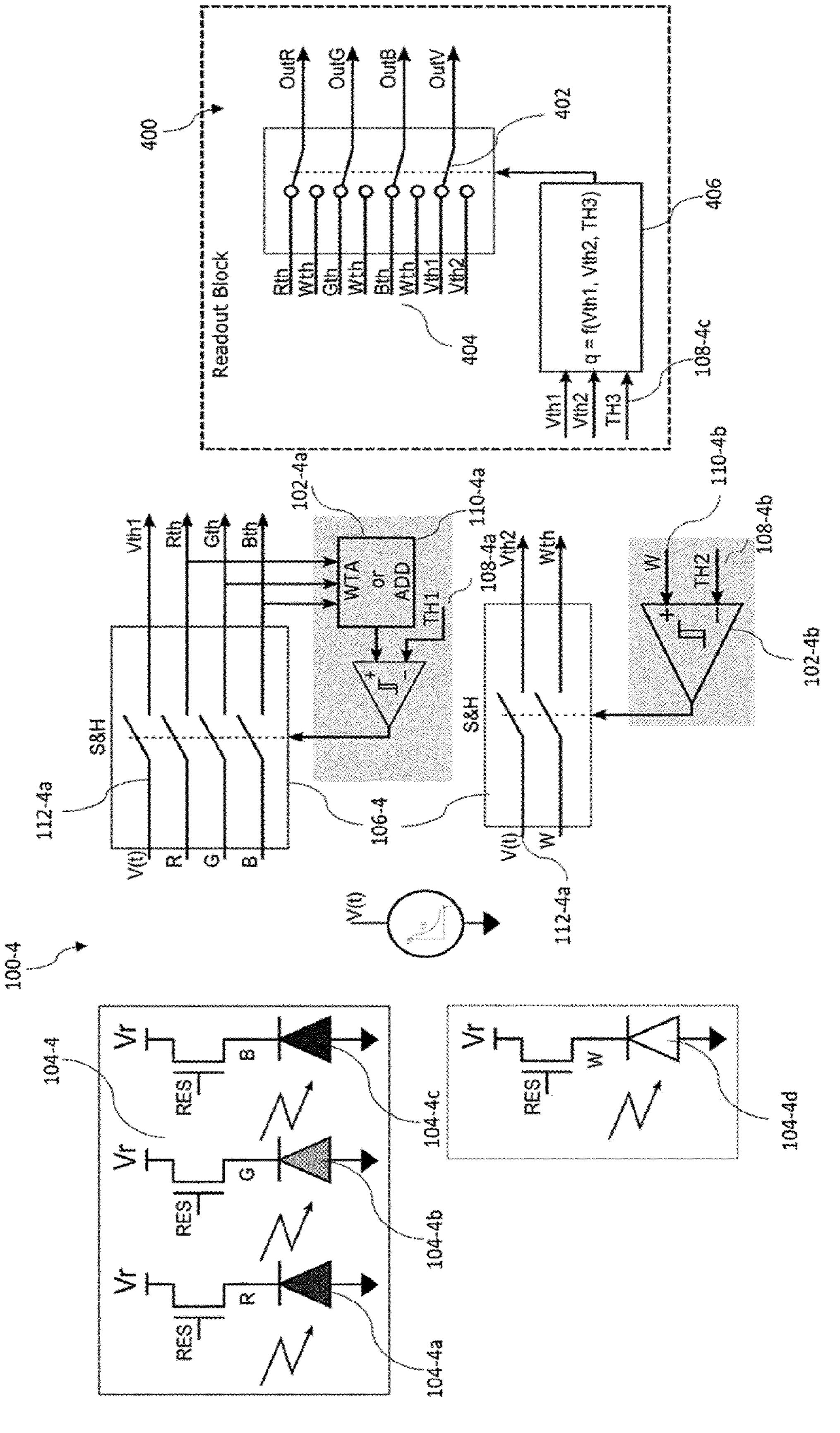
FIG. 10 is a further schematic diagram of a further exemplary circuit according to embodiments of the invention.

In a further variation of the fifth exemplary implementation, as shown in FIG. 10, an alternative readout block 400 is controlled by a more complex function of the first stored value Vth1 for the timing signal 112-4*a*, the second stored value Vth2 for the first timing value 112-4*a*, and the third global threshold value 108-4*c*, for a more general management of the output signals. Using a function of these values, it is possible to optimize the signal-to-noise ratio by using the sensors that are more suitable in both very dark and very bright light conditions. It is thus to be understood that whilst comparison between the second value Vth2 of the timing signal 112-4*a* and the third global threshold 108-4*c* is performed according to the fifth exemplary implementation, this is not necessary and a different function may be used to determine what values to filter and/or send to readout circuitry of the sensor array 200 of the six stored values Rth, Gth, Bth, Wth, VTh1 and Vth2. In some examples, the function may be optimised for a particular application domain, and may be generated by a neural network trained according to the particular application domain. The function may also use spatial information, such as the position of the photoreceptor unit in the array, to change the behaviour of the readout block. For example, in an industrial application or in a video surveillance application where the sensor array is installed in a fixed position, different criteria may be applied by the function to switch between the less-sensitive colour vision and the more sensitive grey-level vision in a way that depends on the specific characteristics of the scene. The function may also be implemented by an external complex device, such as a computer. The computer may replace the readout block, and the stored signals input to the readout block may instead be read out by the computer from each photoreceptor. In this way, the computer has access to the Rth, Bth, Gth, Wth, Vth1 and Vth2 values.

It is to be understood that a photodiode that can acquire light with high sensitivity, such as photodiodes that can detect single photons, is a device that occupies more silicon area than a standard photodiode. For this reason, the fifth implementation presented here minimizes the complexity and the area requirements of a sensor that can deliver a good signal-to-noise-ratio not only in normal light conditions but also in very dark scenes.

The behaviour of this fifth implementation is very similar to the one present in the human retina where the red, blue and green cones are activated when there's a good level of intensity of light but are disabled when the intensity of incident light is low while the rods, that are very sensitive photoreceptors, are activated only in presence of dark scenes when the cones are disabled. The fifth implementation above effectively mimics this behaviour using the readout logic circuits in the readout blocks 300 and 400.

Finally with regard to the general architecture 100, the global feedback signals 108-4*a*, 108-4*b*, and 108-4*c* and the shape/function of timing signal 112-4*a* can be tuned by the global control block 202 on the basis of the characteristics of the scene observed. As explained previously, the first and second timing signals 108-4*a* and 108-4*b* are sent on the line carrying the global clock signal 112 together with the other signals (not shown in FIGS. 9 and 10) that are used to synchronize and arrange the operations during the image acquisition cycles.

The sample and hold circuit 106-4 may be implemented as one or two circuits, and represents the memory module 106 or part thereof. The comparators and the WTA/summation circuits that form part of the first and second comparison circuit modules 102-4*a* and 102-4*b* are part of the local control module 102. Also part of the local control module 102 is circuitry to synchronize the operations and information received over the global clock line, while the local feedback line 102 includes the signals generated by the photosensitive elements 104*a*.

It is to be understood that the readout blocks 300 and 400 described above may be used with any or all of the exemplary implementations described above.

Figure 11:
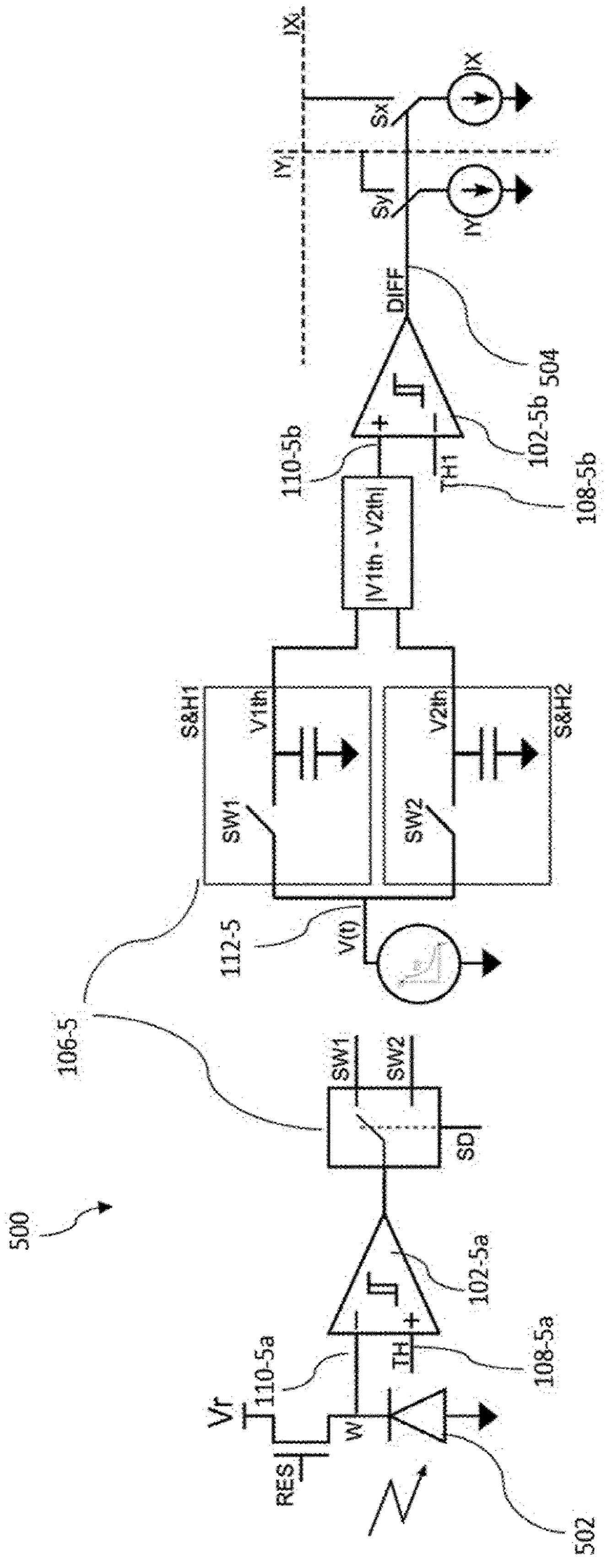
FIG. 11 is a schematic diagram of a further exemplary circuit according to embodiments of the invention.

FIG. 11 is a schematic diagram showing an example of how additional sensors/circuits may be used to complement any of the examples provided above. In particular, the circuit 500 can detect a temporal variation of the impinging light, which could be used to activate the blocks of the architecture of FIG. 1 such that the architecture of FIG. 1 is only used upon a change of the light intensity. This technique may be used to effectively add motion detection features to the apparatus and/or to improve the energy efficiency of the overall architecture depicted in FIG. 1. Instead of continuously processing a large number of signals provided by the blocks of the architecture of FIG. 1, it is even more convenient to process them only when some light changes are detected in the scene. The circuit described in FIG. 11 can be used to build blocks or units that are additional to the blocks and photoreceptor units described in the general architecture depicted in FIG. 11, or these can be included in the Global Control module 202 to provide further functions that can be used to change the global behaviour of the sensor device. FIG. 11 shows a circuit 500 including a first comparison circuit module 102-5*a*, an additional sensor 502, a first global feedback signal 108-5*a*, a first local feedback signal 110-5*a*, a two-way switch included in the sample and hold circuit 106-5.

The circuit 500 also includes a second comparison circuit module 102-5*b*, a second global feedback value 108-5*b*, a second local feedback signal 110-5*b*, and output circuitry 504. The operation of these components is described below.

The general cycles and phases described above also apply here. The additional sensor 502 could be an Infrared (IR) sensor or a visible white light photosensitive diode for example. This additional sensor is used in the same way as described above, with reference to the white-light photosensitive diodes 104-3*d* and 104-4*d* of FIG. 7 and FIGS. 9 and 10 respectively. After the reset phase (RES), the additional sensor 502 starts integrating the light or any another physical signal it is designed to detect and its output voltage 110-5*a* starts to decrease linearly over time. This signal forms the first local feedback signal 110-5*a* and is fed into the first comparison circuit module 102-5*a*. The first global threshold value 108-5*a* is also fed into the first comparison circuit module 102-5*a*. When the first local feedback signal 110-5*a* from the additional sensor 502 reaches the first global threshold value 108-5*a* TH, the first comparison circuit module 102-5*a*, with the use of a comparator, changes its output voltage from logical LOW to HIGH thus instructing the sample and hold module 106-5 to store the timing signal V(t) 112-5 at a time T.sub.o in one of the two memory modules S&H1, S&H2, thus updating the output values V1*th*and V2*th*, according to the state of a two-way switch, controlled by the global signal SD, that generates the signals SW1 and SW2 . . . . During the next image acquisition cycle, for the next frame recorded over an array 200, the process is repeated and the value of the timing signal V(t) 112-5 corresponding to a time T1 is stored on the other memory module 106-5 S&H1 or S&H2 of according to the value of a global control signal SD. So, for example, if in the first cycle, the value of the timing signal 112-5 is stored in the S&H1 memory module, in the next cycle it will be stored in the S&H2 memory module and then in the next cycle in the line memory module S&H1 again, and so on. The global signal SD is used to select, at each image acquisition cycle, the outputs SW1 and SW2 of the two-way switch included in the memory module 106-5. In this way, at each image acquisition cycle, the values V1*th*and V2*th*stored on the output of the sample and hold module 106-5 will alternatively represent the current value and the value at the previous image acquisition cycle of the timing signal 112-5 when the global threshold TH 108-5*a* has been crossed by the output 110-5*a* of the additional sensor 502. The absolute value of the difference between the two analogue voltages V1*th*and V2*th*is then used as the second local feedback signal 110-5*b* and is fed into the second comparison circuit module 102-5*b*. The second comparison circuit module 102-5*b* compares the second local feedback signal 110-5*b* with a second global threshold value 108-5*b*, to produce an output signal DIFF on an output line 504. The DIFF signal on the output line 504 will be LOW when the second global threshold value 108-5*b* is not crossed and will be HIGH when the second global threshold value 108-5*b* is crossed.

In this way it is possible to control two switches Sx and Sy that can activate the two current sources IY and IX to inject some fixed amount of current into respective output lines as described below. For example, in FIG. 11 the two current sources IX and IY of a generic pixel with coordinates (i,j) in the sensor array 200 are shorted with the row bit-line (IXi) and with the column bit-line (IYj) respectively only if the comparator of the second comparison circuit module 102-5*b* has detected a significant change in light intensity (DIFF=HIGH). In this case the two switches Sx and Sy connect the two current sources IX and IY to the respective bit-lines IXi and IYj, otherwise, if DIFF=LOW, the two current sources are disconnected from the bit-lines and do not contribute to the total current flowing in the involved bit-lines. The circuit 500 is therefore equivalent to a photosensitive element that generates a LOW voltage on the output line 504 when the difference in the intensity of the incident signal (light, for example) between two consecutive acquisition cycles does not reach a given threshold (in this case below the value TH1 of the second global threshold value 108-5*b*) and generates a HIGH voltage on the output line 504 otherwise. In the case of an imaging application, quick changes in the intensity of the light detected by the additional sensor 502 are often caused by a moving object that crosses the scene. In this way, the circuit 500 can be considered a "motion/event detector" pixel or "motion/event pixel" and such pixels can be added/merged in the sensor array 200 or in the global control module 202 to build sensors that are able to detect moving objects in the scene or can react to the presence of moving objects.

For example, in FIG. 11, in the case in which the sensor array 200 comprises only of motion/event pixels 500 instead of sensor units 100 or the sensor array 200 comprises an array of motion/event pixels 500 and an array of sensor units 100 sensors, the currents flowing through the row and the column bit-lines connected to the motion/event pixels 500 are proportional to the amount of motion that is generated by moving objects in the scene during the image acquisition phase. More generally, the significant change in intensity between frames, registered by the circuit 500, can be used to infer motion detected by the circuit 500. A plurality of such circuits 500 can be positioned throughout the array 200 to track motion throughout the array 200. Furthermore, the image acquisition phase for photoreceptor units 100 can be made dependent on detection of such motion in the field of view of the array 200. In this way, it is possible to use the circuit 500 in combination with any of the examples provided above in FIGS. 1 to 10 to provide a motion-activated sensor array.

The circuit 500 is thus advantageous because it can be used to detect motion and, for example, can be used to activate the array 200 when some motion is detected or to store the voltages generated by the photodiodes in the memory module 106 when some motion is detected or to stop/reset the photodiodes operation when there is no motion in the scene. All these exemplary mechanisms can result in a significant energy saving during operations and/or can be beneficial for the applications where motion detection is important like in automatic video surveillance.

Figure 12:
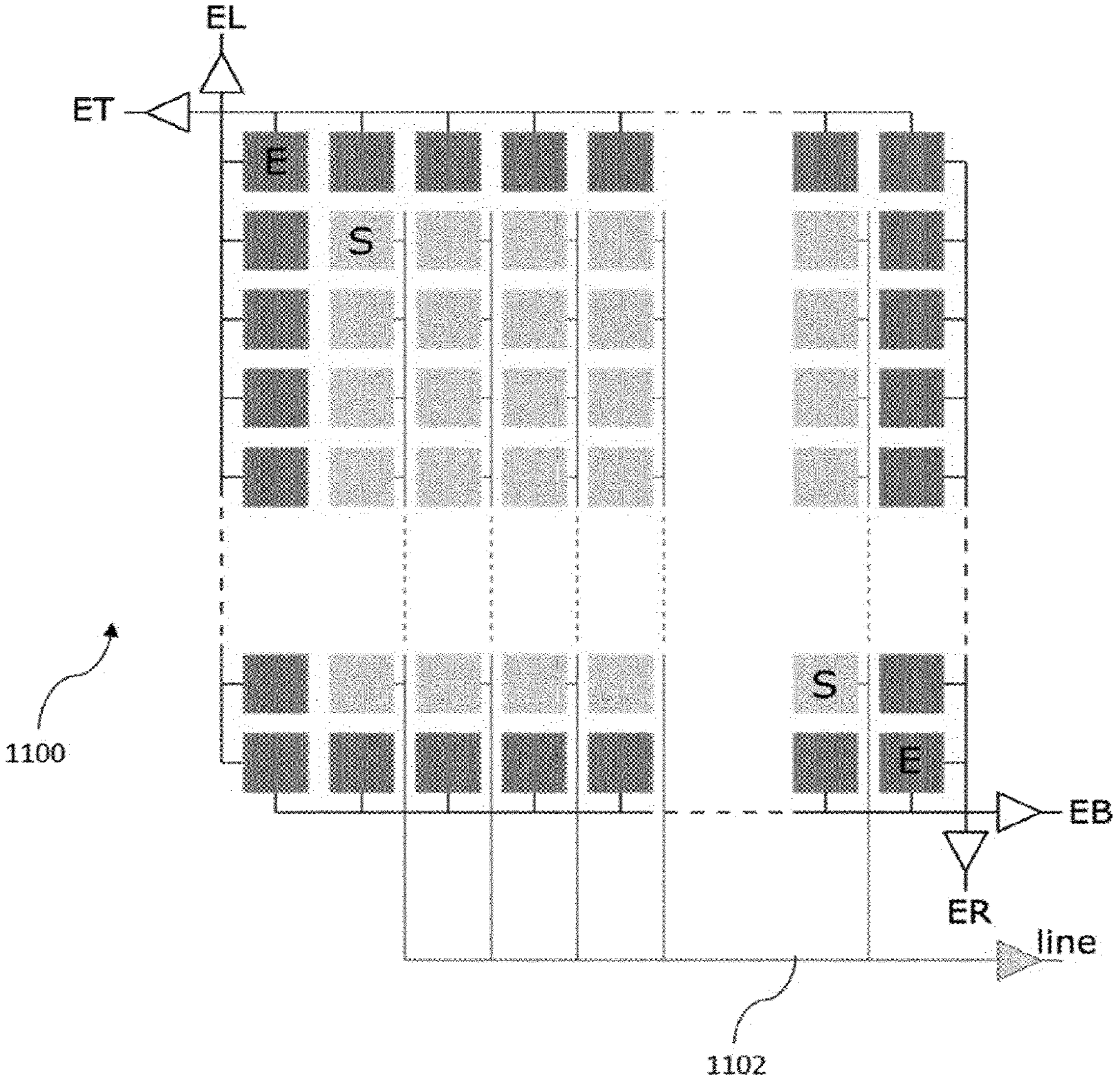
FIG. 12 is a schematic diagram of a sensor array according to embodiments of the invention.

Although FIG. 1 shows a uniform sensor array 200 of sensor units 100*a* to 100*n*, it is to be understood that this is not required, and the sensor array 200 may have an irregular layout depending on its intended use/function. For example, the sensor array can include an internal array of small form-factor sensor units designed to acquire, at high-resolution, the central area of a scene. Such a central area can be surrounded by a frame containing bigger sensors units designed to detect, with high sensitivity, high-speed moving objects on the periphery of the scene. This example mechanism would thus mimic the so-called peripheral vision in human eyes that is focused on motion detection. FIG. 12 shows an example of such a sensor architecture 1100 based on two different types of photoreceptors, a first photoreceptor type E and a second photoreceptor type S. For the sake of clarity in FIG. 12, both of these photoreceptor types E and S have the same size, and a frame that is only formed from one peripheral layer of photoreceptor of the first type E. However, in general, the first and second types of photoreceptor E and S have a different geometry and/or size, while the frame formed by the first type of photoreceptors E comprises an arbitrary number of horizontal/vertical lines and layers of the first type photoreceptors E. The second type photoreceptors S form the inner part of the array and may include, for example, one or more of the first, second, third, fourth of fifth exemplary implementations described above and illustrated in FIGS. 3 to 10. The role of the second type is to acquire images at high resolution and high dynamic range. The first type photoreceptors E, placed on the frame around the central portion of the array 1100, may include, for example, the type described in FIG. 11 and may be, for example, configured to detect motion events generated by moving objects entering or exiting a scene being observed by the array 1100. The motion of an object can be detected by measuring the temporal change of the intensity of the light impinging on the photoreceptor E, as shown in the further exemplary implementation of FIG. 11.

Figure 13:
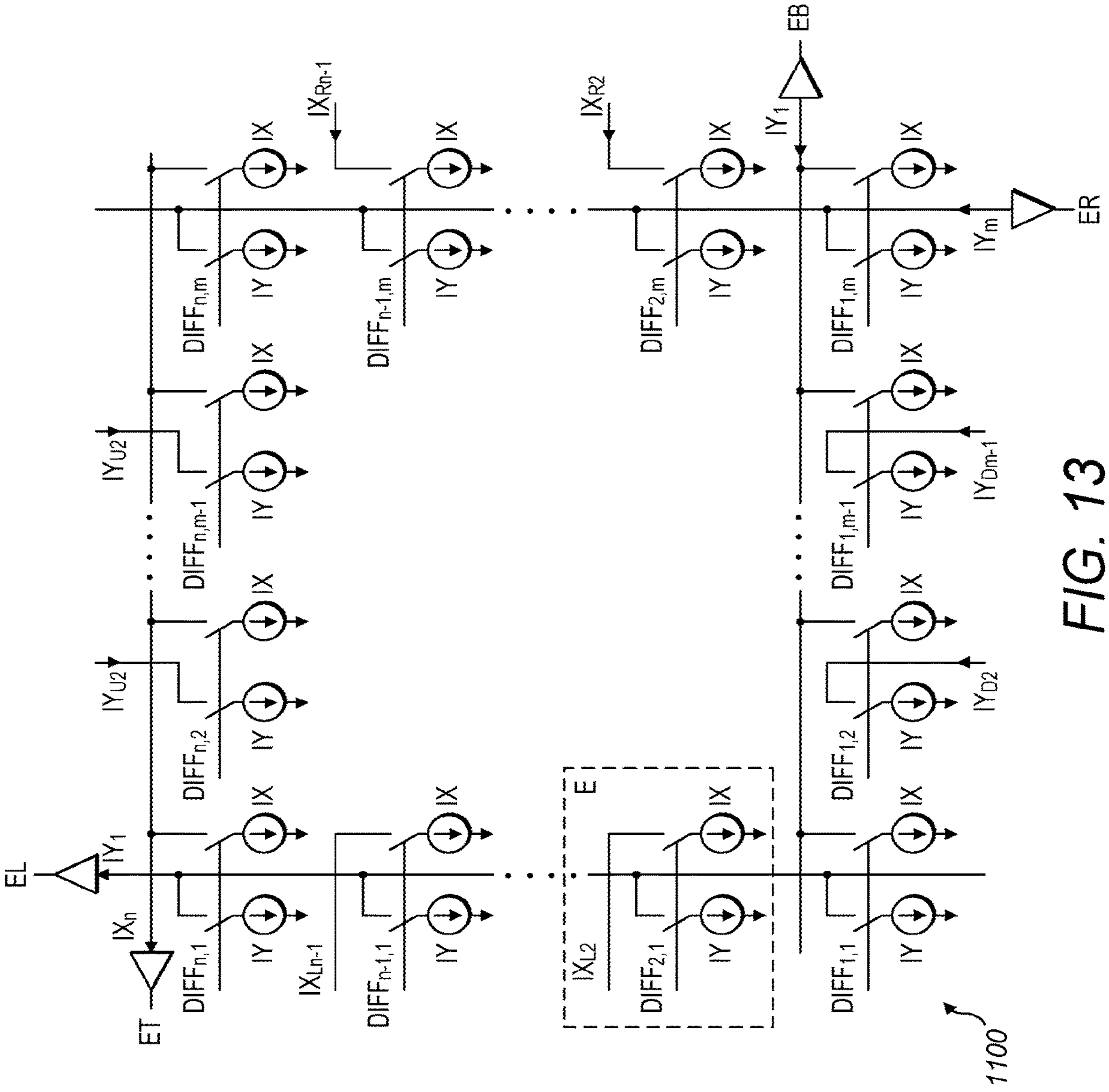
FIG. 13 is a further schematic diagram of the sensor array of FIG. 12 according to embodiments of the invention.

For the sake of clarity, FIG. 13 represents the same sensor architecture 1100 of FIG. 12 showing how the currents sources IX and IY of each circuit 500 described in FIG. 11 are summed along the X and Y directions of the array to allow detecting light intensity changes. In this case, each of the circuits 500 is represented by a unit E, which is illustrated by only the two switches, controlled by the signal DIFF, and the two current sources IX and IY.

The output signals of the inner part of the array, made of the second photoreceptors S, are delivered through a line 1102. The motion information is detected and output along each of the four sides of the array 1100 shown in FIG. 10 through four output lines (ET, EL, ER, EB). Under normal operation, the inner part of the array including the second type photoreceptors S is typically OFF, while the first type photoreceptors E at the periphery of the array 1100 are always ON to continuously detect motion along the perimeter of the array 1100. As soon as a significant change in light intensity is detected by the first type photoreceptors E, the inner array of the second type photoreceptors S is activated to acquire images with higher resolution and high dynamic range.

While the operation of the second type photoreceptors S requires significant power and data bandwidth, the motion detection task performed with the first type photoreceptors is simpler, energy efficient and cheaper in terms of data bandwidth requirements. The split operation set out above, whereby the motion detection task turns on the more intensive second type photoreceptors S, minimizes the power consumption, and data bandwidth toward an external computer, mimicking the operation of the human retina.

The motion information represented by the currents flowing through the EL, ET, EB and ER lines in FIGS. 12 and 13 can be used by the global control module 202 as feedback signals for the logic implemented in the global control module 202 to activate specific actions. An example is the power saving mechanism described above when such information is used to power on or off the inner array of second-type photoreceptor S. In another example these 4 signals can be aggregated in a single "motion detected" signal that can be forwarded to an external application. In this case, for example, when the "motion detected" signal is HIGH (i.e., a moving object has been detected) it can be used to wake-up an external controller that, in turn, can process and store the images generated by the sensor while, when the signal "motion detected" is LOW (i.e., when there are no moving objects in the scene), the external controller can enter a stand-by/sleep/power-saving mode that will optimize, at system level, the energy use and the space used to save the relevant videos/images. In a further example the values of the currents flowing through the EL, ET, EB and ER lines can be sampled and sent directly to the external application using dedicated output lines.

Although the above description focuses on imaging sensors and the use of photosensitive diodes as the sensor elements 104, it is to be understood that any sensor may be used in the same global/local feedback configuration. For example, thermal sensors, pressure sensors or any other type of sensor that can be used in an array may be implemented instead of the photodiodes.

The sensor array 200 described above may be implemented in many different devices and apparatus. For example, if the sensor array 200 includes optical or infrared sensors 104, it may be included in a camera or surveillance device. It may also be incorporated in telescopes, satellites or the like, for observing a scene. Where the sensors are sensors that are designed to detect different wavelengths in the electromagnetic spectrum, the sensor array 200 may be used on satellites or other space-craft and observatories. Where the sensors 104 include pressure sensors or touch sensors, for example, the sensor array 200 may be used in smart floor panels and the like.

An important application domain for the sensor array 200 is represented by Artificial or Machine Vision where the images generated by the sensor array 200 are post-processed by some computing device to extract the information that is considered relevant for the specific application. Some examples have been already given in the paragraphs above (for example in the security or video surveillance applications where presence/absence of motion in a scene is an type of important information). More generally, an important feature enabled by this invention is the ability of the sensors and/or receptors forming the sensor array 200 to adapt themselves (i.e., locally) to the intensity of the incident signal in order to maximize the signal-to-noise ratio even when the incident signal is very strong or very weak, and even when such light conditions are simultaneously present in the acquired image. The sensor array can thus have a different response at different locations within it, at different receptors, based on the differences in incident signal. Moreover, the flexible global feedback mechanisms implemented by the global control module 202, that can be totally or partially implemented in software by an external computer, can also optimize the response of the sensors when used in a specific application. For example, in an automotive application, the global control module can analyse the images generated by the sensor array and tune, as described above, the timing signal V(t) or the global threshold values used in the different modules to increase the accuracy of the acquisition of the interesting areas of the image (e.g. the area where, for example, a road sign is present and the application needs to read it) while other areas (e.g. the areas containing the sky or the road surface) can be acquired with a lower accuracy. This behaviour is similar to what happens in human vision where the brain decides which portion of the observed scene has to be acquired with high accuracy and sends to the eyes the signals to "configure" the eyes to do so.

To tune the sensors or photoreceptors of the sensor array as described above, one or more neural networks may be used to generate or modify the timing signal V(t) or any of the global threshold values. The one or more neural networks may be trained for a specific application. In the above example, the application may be related to driving a vehicle.

Control of the sensor array 200 may be performed by a computer or computing device. The computer or computing device may be in communication with, or form part of the goal control module 202. As explained above, the global control module 202 can adjust various parameters of the embodiments, including global threshold values and global clock signals, and other related signals. These signals may be adjusted dynamically and in real-time in response to changes in characteristics of a scene or other sensory environment being observed. The characteristics that change may be observed by observing differences between frames or discrete exposures of the sensors 104. The signals may be adjusted by the computer via application of a neural network or any suitable machine-learning algorithm.

In the above description, performance of the method and various functions of the system may be implemented using a computing and/or electronic device. Such a device may comprise one or more processors which may be microprocessors, controllers or any other suitable type of processors for processing computer executable instructions to control the operation of the device in order to gather and record routing information. In some examples, for example where a system on a chip architecture is used, the processors may include one or more fixed function blocks (also referred to as accelerators) which implement a part of the method in hardware (rather than software or firmware). Platform software comprising an operating system or any other suitable platform software may be provided at the computing-based device to enable application software to be executed on the device.

Various functions described herein can be implemented in hardware, software, or any combination thereof. If implemented in software, such as a computer program, the functions can be stored on or transmitted over as one or more instructions or code on a computer-readable medium. Computer-readable media may include, for example, computer-readable storage media. Computer-readable storage media may include volatile or non-volatile, removable or non-removable media implemented in any method or technology for storage of information such as computer readable instructions, data structures, program modules or other data. A computer-readable storage media can be any available storage media that may be accessed by a computer. By way of example, and not limitation, such computer-readable storage media may comprise RAM, ROM, EEPROM, flash memory or other memory devices, CD-ROM or other optical disc storage, magnetic disc storage or other magnetic storage devices, or any other medium that can be used to carry or store desired program code in the form of instructions or data structures and that can be accessed by a computer. Disc and disk, as used herein, include compact disc (CD), laser disc, optical disc, digital versatile disc (DVD), floppy disk, and Blu-ray® disc (BD). Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, DSL, or wireless technologies such as infrared, radio, and microwave are included in the definition of communication medium. Combinations of the above should also be included within the scope of computer-readable media.

Alternatively, or in addition, the functionality described herein can be performed, at least in part, by one or more hardware logic components. For example, and without limitation, hardware logic components that can be used may include Field-programmable Gate Arrays (FPGAs), Program-specific Integrated Circuits (ASICs), Program-specific Standard Products (ASSPs), System-on-a-chip systems (SOCs). Complex Programmable Logic Devices (CPLDs), etc.

Although illustrated as a single system, it is to be understood that the computing device may be a distributed system. Thus, for instance, several devices may be in communication by way of a network connection and may collectively perform tasks described as being performed by the computing device.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilising conventional techniques known to those skilled in the art that all, or a portion of the software instructions may be carried out by a dedicated circuit, such as a DSP, programmable logic array, or the like.

Moreover, the acts described herein may comprise computer-executable instructions that can be implemented by one or more processors and/or stored on a computer-readable medium or media. The computer-executable instructions can include routines, sub-routines, programs, threads of execution, and/or the like. Still further, results of acts of the methods can be stored in a computer-readable medium, displayed on a display device, and/or the like.

As used herein, the term 'computer' or 'external memory' is intended to encompass computer-readable data storage that is configured with computer-executable instructions that cause certain functionality to be performed when executed by a processor. The computer-executable instructions may include a routine, a function, or the like. It is also to be understood that a computer may be localized on a single device or distributed across several devices.

Further, as used herein, the term "exemplary" or 'example' is intended to mean "serving as an illustration or example of something".

Further, to the extent that the term "includes" is used in either the detailed description, such term is intended to be inclusive in a manner similar to the term "comprising".

While the methods are shown and described as being a series of acts that are performed in a particular sequence, it is to be understood and appreciated that the methods are not limited by the order of the sequence. For example, some acts can occur in a different order than what is described herein. In addition, an act can occur concurrently with another act. Further, in some instances, not all acts may be required to implement a method described herein.

The order of the operations of the methods described herein is exemplary, but the operations may be carried out in any suitable order, or simultaneously where appropriate. Additionally, operations may be added or substituted in, or individual operations may be deleted from any of the methods without departing from the scope of the subject matter described herein. Aspects of any of the examples described above may be combined with aspects of any of the other examples described to form further examples without losing the effect sought.

It will be understood that the above description of embodiments is given by way of example only and that various modifications may be made by those skilled in the art. What has been described above includes examples of one or more embodiments. It is, of course, not possible to describe every conceivable modification and alteration of the above devices or methods for purposes of describing the aforementioned aspects, but one of ordinary skill in the art can recognize that many further modifications and permutations of various aspects are possible.

What is claimed is:

1. An imaging sensor unit comprising:

a sensor module including a plurality of photosensors;

a memory module coupled to the sensor module, the memory module configured to receive a sensor output from the sensor module;

a local control module coupled to the sensor module, the local control module configured to:

receive a local feedback signal from the sensor module;

receive a global feedback signal; and use the local feedback signal and the global feedback signal to control the memory module to store the sensor output, wherein the global feedback signal includes a threshold value; and wherein the local control module is configured to:

compare the local feedback signal to the threshold value of the global feedback signal; and upon the local feedback signal meeting the threshold value, control the memory module to store the sensor output, wherein the plurality of photosensors include:

a first photosensor sensitive to a first portion of the visible spectrum, the first photosensor configured to output a first sensor output component;

a second photosensor sensitive to a second portion of the visible spectrum, the second photosensor configured to output a second photosensor output component; and a third photosensor sensitive to a third portion of the visible spectrum, the third photosensor configured to output a third photosensor output component;

such that the sensor output includes the first, second and third photosensor output components, wherein the imaging sensor unit further comprises:

a winner-takes-all node configured to:

receive the first, second and third photosensor output components;

determine a winning photosensor output component by identifying which of the first, second and third photosensor output components exhibits the greatest difference in magnitude to an initial value of the respective first, second and third output components; wherein the local feedback signal includes the winning photosensor output component, such that:

the local control module is configured to compare the winning photosensor output component and the threshold value of the global feedback signal;

wherein, upon the winning photosensor output component meeting the threshold value, the local control module is configured to:

cause the memory module to store the first, second and third photosensor output components.

2. The imaging sensor unit of claim 1, wherein the first photosensor is sensitive to red light, the second photosensor is sensitive to green light, and the third photosensor is sensitive to blue light.

3. The imaging sensor unit of claim 1, wherein the plurality of photosensors include a wide-spectrum photosensor, the wide-spectrum photosensor being configured to detect a brightness of an observed scene and produce a brightness output, wherein the local feedback signal includes the brightness output, such that, upon the brightness output meeting the threshold value of the global feedback signal, the local control module is configured to:

cause the memory module to store the sensor output.

4. The imaging sensor unit of claim 1, wherein the plurality of photosensors include a wide-spectrum photosensor for detecting light in low-light conditions, the wide-spectrum photosensor having a higher sensitivity than the first, second and third photosensors, wherein the wide-spectrum photosensor is configured to detect a brightness of an observed scene and produce a brightness output;

wherein the local control module is further configured to receive a second local feedback signal and a second global feedback signal, wherein the second local feedback signal includes the brightness output, and wherein the second global feedback signal includes a second threshold value;

wherein the local control module is configured to compare the second local feedback signal to the second threshold value, such that, upon the second local feedback signal meeting the second threshold value, the local control module is configured to:

cause the memory module to store the brightness output;

wherein the imaging sensor further comprises a readout module, configured to output, from the imaging sensor, one or more of the brightness output, the first, second and third photosensor element outputs, based on a result of a comparison with, or function of, a third global feedback signal received at the readout module.

5. The imaging sensor unit of claim 3, wherein the wide-spectrum photosensor is configured to detect white light.

6. The imaging sensor unit of claim 3, wherein the wide-spectrum photosensor is configured to detect infrared light.

7. The imaging sensor unit of claim 1, wherein the imaging sensor is subject to a maximum exposure time, wherein, if the local feedback signal does not meet the threshold value, within the maximum exposure time, the memory module is configured to store the sensor output.

8. The imaging sensor unit of claim 1, wherein, the local control module is further configured to:

cause the memory module to store timing information indicative of a time at which the sensor output is stored.

9. The imaging sensor unit of claim 8, wherein the memory module is configured to receive a timing signal, and wherein the timing information is a recording of the timing signal at the time at which the sensor output is stored.

10. The imaging sensor unit of claim 1, further comprising a sensor array comprising a plurality of imaging sensor units comprising:

a global control module configured to globally control the sensor array, wherein the global control module is configured to provide the global feedback signal to each of the plurality of imaging sensor units.

11. The sensor array of claim 10, wherein the global feedback signal is adjustable to adjust the characteristics of an image captured by the sensor array.

12. The sensor array of claim 10, further comprising a readout circuit configured to readout the stored sensor output from the plurality of imaging sensor units, wherein the readout circuit is further configured to readout timing information for each of the plurality of imaging sensor units, wherein the timing information is indicative of a time at which the stored sensor output is stored for each of the plurality of imaging sensor units.

13. A method of controlling an imaging sensor unit, wherein the imaging sensor unit comprises:

a sensor module including a plurality of photosensors;

a local control module coupled to the sensor module; and a memory module coupled to the sensor module;

wherein the method comprises:

receiving, at the memory module, a sensor output from the sensor module;

receiving, at the local control module, a local feedback signal from the sensor module;

receiving, at the local control module, a global feedback signal; and using the local feedback signal and the global feedback signal to control the memory module to store the sensor output, wherein the global feedback signal includes a threshold value; and wherein the method comprises:

comparing the local feedback signal to the threshold value of the global feedback signal; and upon the local feedback signal meeting the threshold value, controlling the memory module to store the sensor output, wherein the plurality of photosensors include:

a first photosensor sensitive to a first portion of the visible spectrum, the first photosensor configured to output a first sensor output component;

a second photosensor sensitive to a second portion of the visible spectrum, the second photosensor configured to output a second photosensor output component; and a third photosensor sensitive to a third portion of the visible spectrum, the third photosensor configured to output a third photosensor output component;

such that the sensor output includes the first, second and third photosensor output components, wherein method further comprises:

receiving the first, second and third photosensor output components;

determining a winning photosensor output component by identifying which of the first, second and third photosensor output components exhibits the greatest difference in magnitude to an initial value of the respective first, second and third output components; wherein the local feedback signal includes the winning photosensor output component;

comparing the winning photosensor output component and the threshold value of the global feedback signal; and upon the winning photosensor output component meeting the threshold value, causing the memory module to store the first, second and third photosensor output components.

14. The method of claim 13, further comprising:

operating the imaging sensor unit according to a cycle, the cycle being defined by:

an active sensor phase, initiated by:

activating the sensor module from an initial state such that the sensor module begins to detect and produces the sensor output; and an inactive sensor phase, initiated by:

resetting the sensor module to the initial state, the method further comprising:

entering the active sensor phase; and after storing the sensor output, entering the inactive sensor phase, wherein duration of the active sensor phase is limited by a maximum exposure time, such that the method further comprises:

at the maximum exposure time, causing the memory module to store the sensor output; and entering the inactive sensor phase such that the inactive sensor phase is entered after the maximum exposure time has elapsed, the method further comprising, upon storing the sensor output, storing timing information indicative of a time at which the sensor output is stored.

15. The method of claim 13, further comprising controlling a plurality of imaging sensor units, the method comprising:

synchronously entering the active phase for each of the imaging sensor units.

* * * * *